United States Patent
Lee

(10) Patent No.: US 9,447,712 B2
(45) Date of Patent: Sep. 20, 2016

(54) INTERNAL DETONATION ENGINE, HYBRID ENGINES INCLUDING THE SAME, AND METHODS OF MAKING AND USING THE SAME

(71) Applicant: Brent Wei-Teh Lee, Saratoga, CA (US)

(72) Inventor: Brent Wei-Teh Lee, Saratoga, CA (US)

(\*) Notice: Subject to any disclaimer, the term of this patent is extended or adjusted under 35 U.S.C. 154(b) by 0 days.

(21) Appl. No.: 14/860,428

(22) Filed: Sep. 21, 2015

(65) Prior Publication Data

US 2016/0003044 A1    Jan. 7, 2016

Related U.S. Application Data

(62) Division of application No. 13/946,829, filed on Jul. 19, 2013, now Pat. No. 9,188,002.

(60) Provisional application No. 61/797,161, filed on Nov. 30, 2012, provisional application No. 61/741,661, filed on Jul. 24, 2012.

(51) Int. Cl.
| | |
|---|---|
| *F01L 7/06* | (2006.01) |
| *F02K 7/06* | (2006.01) |
| *F01B 21/04* | (2006.01) |

(Continued)

(52) U.S. Cl.
CPC ............... *F01L 7/06* (2013.01); *F01B 21/04* (2013.01); *F01L 5/045* (2013.01); *F02B 69/06* (2013.01); *F02C 5/02* (2013.01); *F02C 5/12* (2013.01); *F02K 7/06* (2013.01); *F01L 1/02* (2013.01);

(Continued)

(58) Field of Classification Search
CPC ............. F01L 7/06; F01L 7/16; F01L 7/021; F01L 7/026; F01L 7/028; F01L 7/029; F01L 7/022; F01L 1/02; F01L 1/022; F01L 1/024; F01L 1/026; F02B 2075/027

See application file for complete search history.

(56) References Cited

U.S. PATENT DOCUMENTS

| | | | |
|---|---|---|---|
| 3,008,292 A | 11/1961 | Logan, Jr. | |
| 4,418,658 A * | 12/1983 | DiRoss | F01L 7/06 123/190.14 |

(Continued)

FOREIGN PATENT DOCUMENTS

GB        2377257 A      1/2003

OTHER PUBLICATIONS

Extended European Search Report; Jul. 15, 2015; European Patent Application No. 13823051; 6 pages; European Patent Office.

(Continued)

*Primary Examiner* — Andrew Nguyen
(74) *Attorney, Agent, or Firm* — Andrew D. Fortney; Central California IP Group, P.C.

(57) ABSTRACT

Hybrid internal detonation-gas turbine engines incorporating detonation or pulse engine technology (such as an internal detonation engine), and methods of manufacturing and using the same are disclosed. The internal detonation engine includes a detonation chamber having a fuel igniter therein, a stator at one end of the detonation chamber having at least a first opening to receive fuel, a rotor adjacent to the stator, and an energy transfer mechanism configured to convert energy from igniting or detonating the fuel to mechanical energy. The detonation chamber and fuel igniter are configured to ignite or detonate a fuel in the detonation chamber. Either the stator or the detonation chamber has a second opening to exhaust detonation gas(es). The rotor has one or more third openings therein configured to overlap with at least the first opening as the rotor rotates.

21 Claims, 14 Drawing Sheets

(51) Int. Cl.
*F02B 69/06* (2006.01)
*F01L 5/04* (2006.01)
*F02C 5/12* (2006.01)
*F02C 5/02* (2006.01)
*F01L 1/02* (2006.01)

(52) U.S. Cl.
CPC ......... *F05B 2220/302* (2013.01); *Y02T 50/671* (2013.01)

(56) References Cited

U.S. PATENT DOCUMENTS

| | | | |
|---|---|---|---|
| 4,520,765 A | 6/1985 | Gerace | |
| 4,815,428 A | 3/1989 | Bunk | |
| 4,930,315 A * | 6/1990 | Kanesaka | F02B 29/00 60/600 |
| 5,418,399 A | 5/1995 | Klaue | |
| 5,513,489 A | 5/1996 | Bussing | |
| 5,901,550 A | 5/1999 | Bussing et al. | |
| 5,983,624 A | 11/1999 | Anderson | |
| 5,988,133 A * | 11/1999 | Agapiades | F01L 7/028 123/190.14 |
| 6,029,617 A * | 2/2000 | Lambert | F01L 1/34 123/190.14 |
| 6,095,106 A * | 8/2000 | Kaluris | F01L 7/023 123/190.1 |
| 7,100,360 B2 | 9/2006 | Sammann et al. | |
| 7,721,555 B2 | 5/2010 | Sharp et al. | |
| 8,141,360 B1 | 3/2012 | Huber | |
| 2004/0154306 A1 | 8/2004 | Benians | |
| 2007/0157625 A1 | 7/2007 | Snyder et al. | |
| 2008/0057223 A1 | 3/2008 | Lee et al. | |
| 2008/0149445 A1 | 6/2008 | Kern et al. | |
| 2009/0165438 A1 | 7/2009 | Occhipinti | |

OTHER PUBLICATIONS

International Search Report dated Dec. 16, 2013; International Application No. PCT/US2013/051396; 2 pages; International Searching Authority; Alexandria, VA.

* cited by examiner

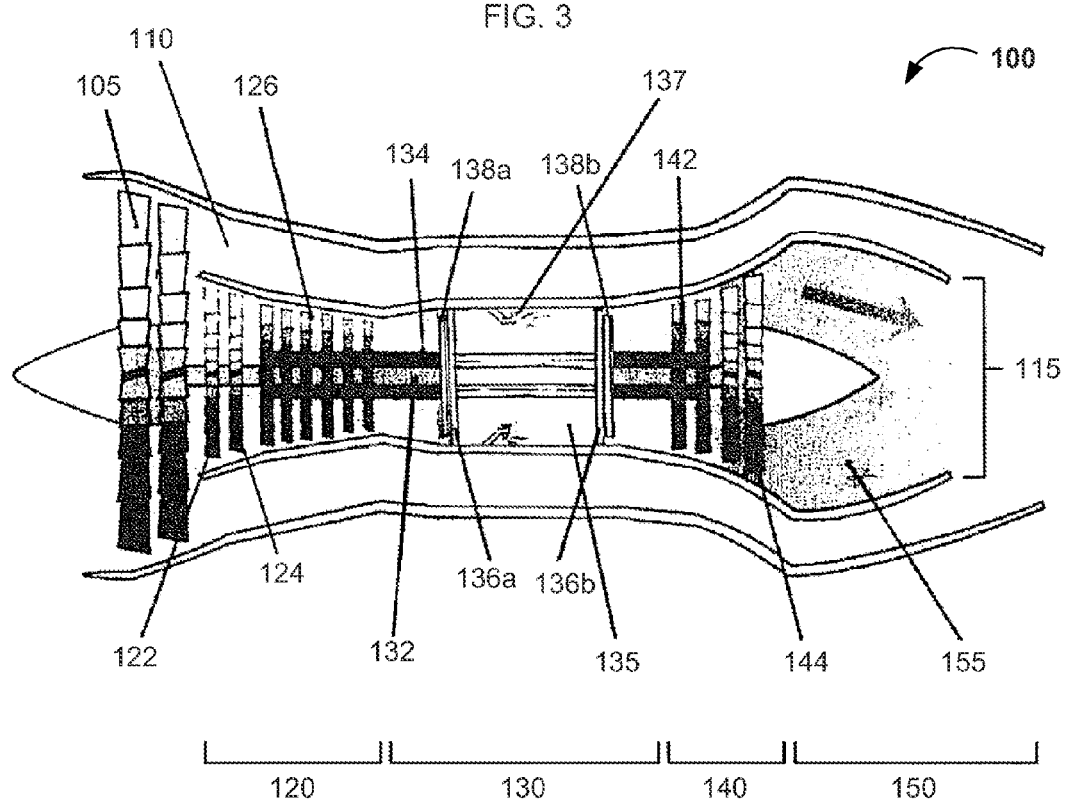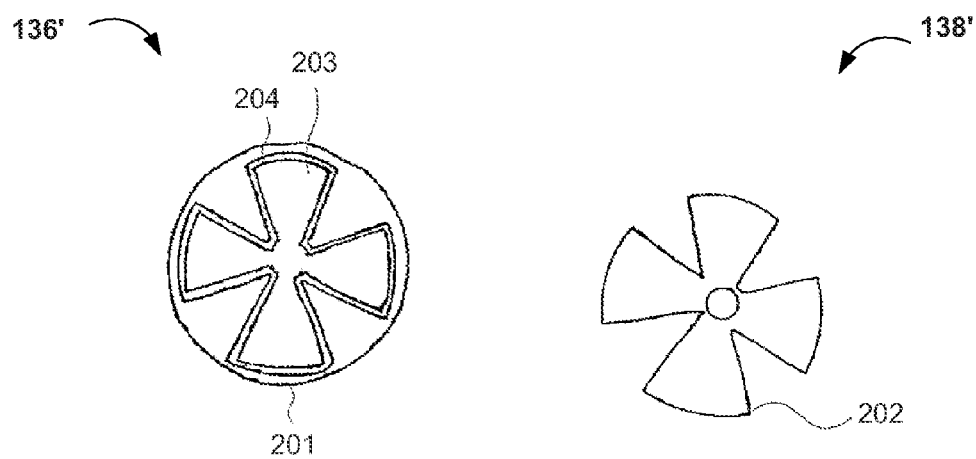

FIG. 5
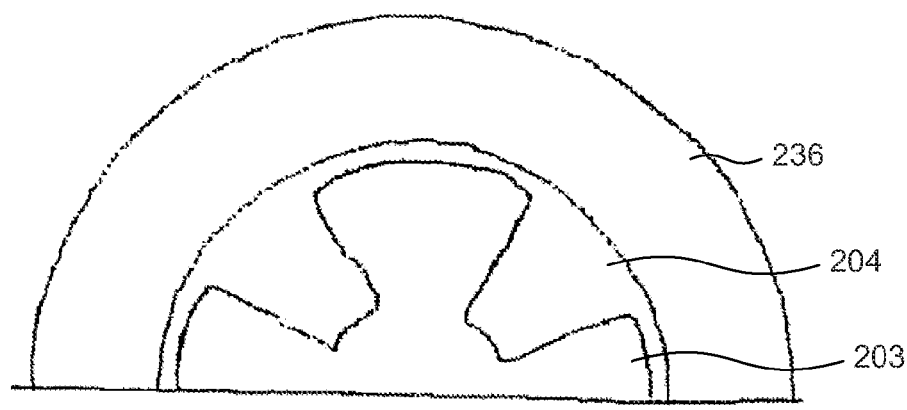
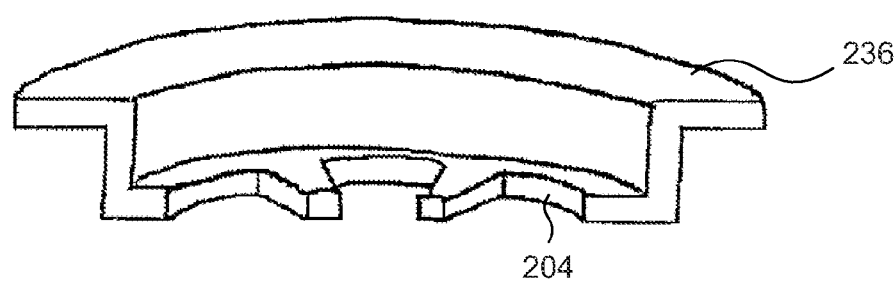
FIG. 6A
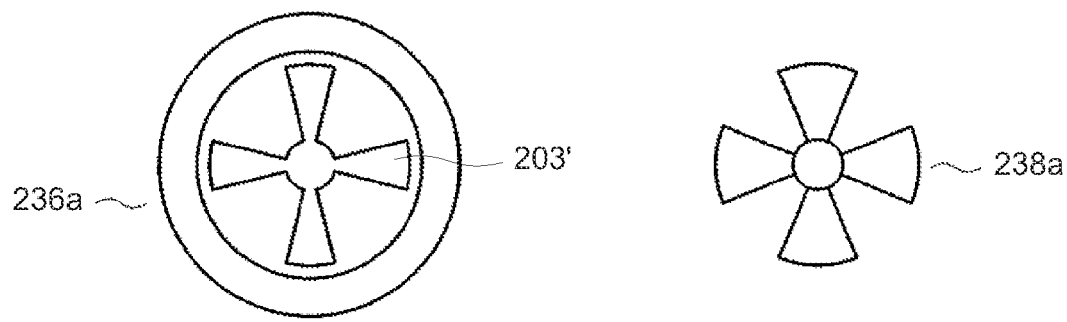
FIG. 6B
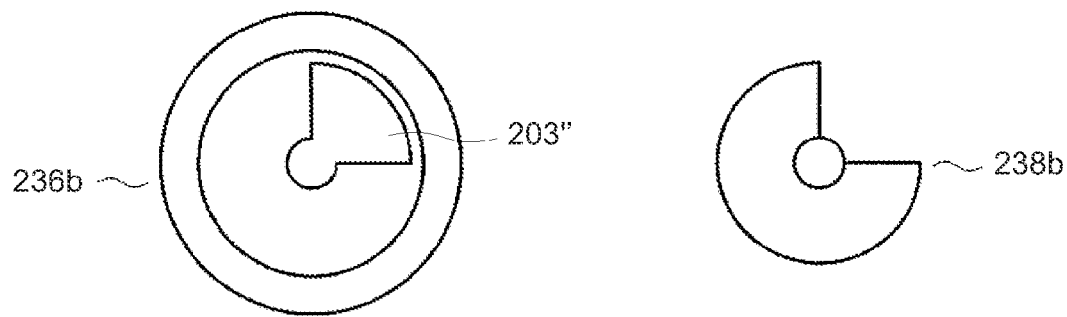

FIG. 18A
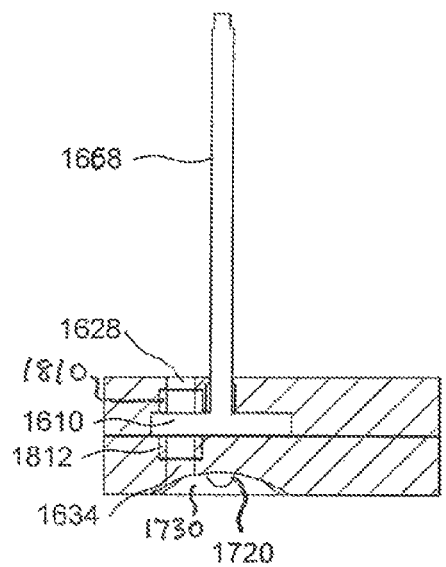
FIG. 18B
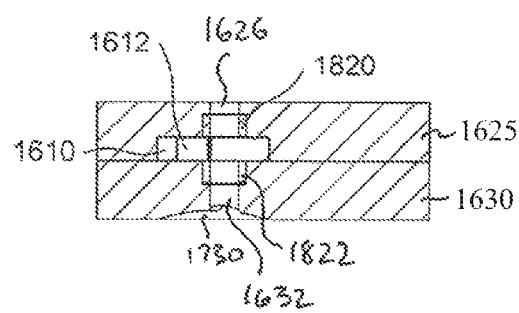
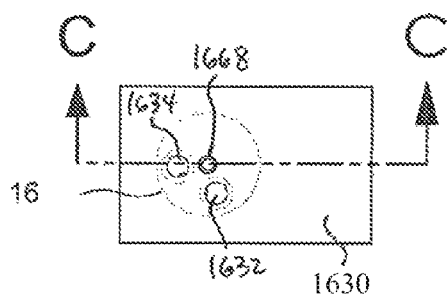
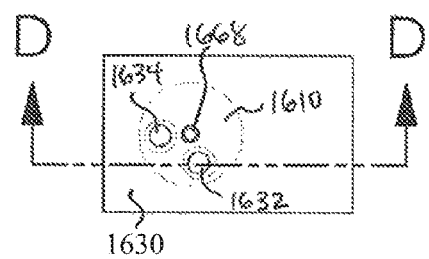
FIG. 18C
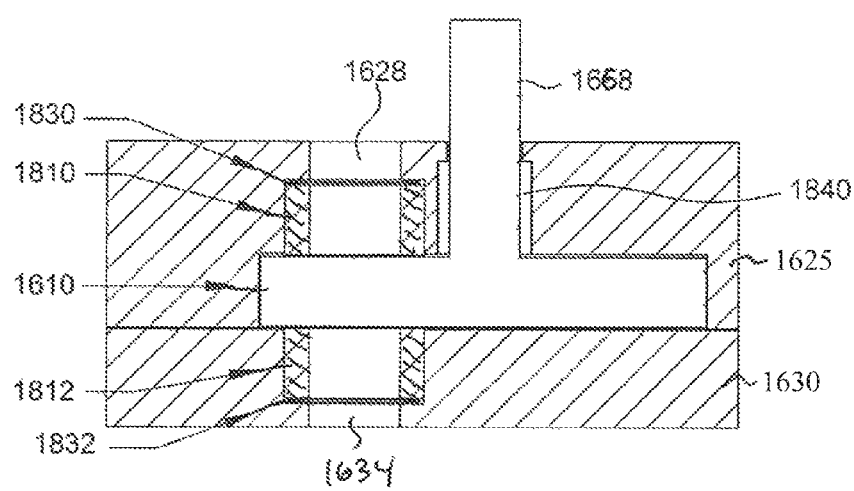

INTERNAL DETONATION ENGINE, HYBRID ENGINES INCLUDING THE SAME, AND METHODS OF MAKING AND USING THE SAME

CROSS REFERENCE TO RELATED APPLICATION

This application claims the benefit of U.S. patent application Ser. No. 13/946,829, filed on Jul. 19, 2013 (incorporated herein by reference), which claims the benefit of U.S. Provisional Patent Application Nos. 61/741,661, filed on Jul. 24, 2012, and 61/797,161, filed on Nov. 30, 2012, each of which is incorporated herein by reference as if fully set forth herein.

FIELD OF THE INVENTION

The present invention generally relates to the field of gas turbine technology. More specifically, embodiments of the present invention pertain to a novel internal detonation engine, hybrid engines including the same (e.g., hybrid internal detonation-gas turbine engines), and methods of manufacturing and using the same.

DISCUSSION OF THE BACKGROUND

Turbine engines have been used to propel vehicles such as jets and to produce electrical power for industry and central power generation. Typically, a gas turbine consists of a compressor, a combustor, and a turbine in a sequential arrangement. Influent air is compressed to a high-pressure in the compressor and is fed at a high speed and pressure into the combustor, where the air is mixed with a fuel and is combusted to produce a hot, pressurized stream of gas that is passed into the turbine section where the gas expands and drives a turbine. The turbine converts the energy (e.g., enthalpy) of the gas into mechanical work used to drive the compressor and optionally other devices coupled to the gas turbine.

Recent technology advancements have enabled the production of small gas turbine engines that are lighter weight and cheaper than gasoline combustion engines used for most cars. Such turbine engines also produce less pollution. Diagrams of two conventional gas turbine engines are shown in FIGS. 1 and 2.

FIG. 1 shows a conventional gas turbine engine 10, which is typically used in power generation. The gas turbine 10 of FIG. 1 includes a compressor section 14 (which may have multiple stages) for increasing the pressure and temperature of influent air (e.g., at air intake 12); a combustion section or chamber 16 having multiple combustion chambers located around the perimeter of the engine, in which fuel is ignited to further increase the temperature and pressure of the influent air; and a turbine section 18 in which the hot, pressurized air or exhaust 20 is delivered to drive the rotors of the turbine and generate mechanical energy to spin the central axle of the turbine and generate power.

FIG. 2 shows a conventional turbofan turbine engine 50 that can be used for aircraft propulsion. The conventional turbofan engine 50 includes a large fan 52 at the front of the engine 50 that accelerates influent air and passes it into a low-pressure compressor 60 and/or high-pressure compressor 62 and into fan ducts 80 that pass along the outside of the engine 50. The compressors 60 and 62, a combustion chamber 70, and high-pressure and low-pressure turbine sections 72, 74 of the turbofan engine 50 work in a similar manner to the gas turbine engine 10 of FIG. 1. The operation of the turbofan engine 50 differs from the gas turbine engine 10, in that the "bypass flow" (the air that is accelerated by the fan 52 and passed through the fan duct 80) contributes to the total thrust produced by the engine.

Just about all conventional jet engines and most rocket engines operate on the deflagration of fuel, that is, the rapid but subsonic combustion of fuel. The combustion of fuel in the combustion chamber of conventional gas turbine and turbofan engines exerts force on the turbine blades and creates mechanical power. In such engines, the combustion chamber is an open system and the combustion of fuel is continual. The ignition sources in the combustion chamber (igniters) fire when the engine is started, but are then shut off because fuel and pressurized air from the compressor are constantly fed into the combustion chamber(s) while the engine is running, and ignition of the fuel is thereby sustained.

Although recent technology advancements have enabled the use of smaller, lighter gas turbines that are more efficient and less polluting than other engines types (e.g., combustion engines), the efficiency of gas turbines can be improved. For example, conventional natural gas-fired turbine generators convert only between 25 and 35 percent of the natural gas heating value to useable electricity. Therefore, the need exists for more efficient gas turbine technologies for propelling vehicles and producing electricity.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention relates to a novel internal detonation engine, novel hybrid gas turbine engines that further incorporate a detonation or pulse engine technology (e.g., the internal detonation engine), and methods of manufacturing and using the same. Thus, the present invention provides a hybrid gas turbine engine system that may utilize dual sources of propulsion (measured in m/s or m/s$^2$), gas turbine (or turbofan) impulse and pulse engine impulse. The hybrid gas turbine engine can be adapted as a propulsion system for aircraft, watercraft, and land vehicles. The hybrid gas turbine technology can also be adapted to other applications, such as the efficient production of electricity or mechanical drive systems.

In one aspect, the present invention relates to an internal detonation engine, comprising a detonation chamber having a fuel igniter therein, a stator at an end of the detonation chamber, a rotor adjacent to the stator, and an energy transfer mechanism configured to transfer energy from igniting or detonating the fuel to mechanical energy. The detonation chamber and fuel igniter are configured to ignite or detonate a fuel in the detonation chamber. The first stator has at least a first opening to receive the fuel. Either the stator or the detonation chamber has a second opening to exhaust detonation gas(es). The rotor has one or more third openings therein configured to overlap with at least the first opening as the rotor rotates.

Various embodiments of the present internal detonation engine further include an intake chamber having (i) a fuel intake port in intermittent communication with the first opening and (ii) an exhaust port in intermittent communication with the second opening. The intake chamber and the stator may sealingly house the rotor, and allow the rotor to rotate between the intake chamber and the stator. In addition, the present internal detonation engine may further include a drive mechanism configured to receive the mechanical energy. The drive mechanism may comprise, for example, (1) one or more rods connected to the energy transfer mechanism and (2) a crankshaft receiving the mechanical energy from at least one of the one or more rods. The crankshaft may drive a gear or wheel, the gear or wheel in turn driving one or more shafts or belts. Further embodiments of the present internal detonation engine may further include a timing gear configured to (i) receive the mechanical energy from the drive mechanism and (ii) directly or indirectly rotate the rotor.

In some embodiments, the detonation chamber may comprise a cylinder and a cylinder head, and the energy transfer mechanism comprises a piston attached to the rod, the piston being configured to slidably fit within the cylinder. The cylinder head may have the first and second openings therein. Preferably, a lubricant and/or a surface coating may be between the rotor and its housing (e.g., the intake chamber and the stator), for example, on the surface of the rotor. The surface coating and/or lubricant generally reduce friction between the rotor and the stator. For example, the surface coating may comprise or consist of silicon nitride, which may further function to mechanically protect the rotor.

In some embodiments, the present internal detonation engine further includes a second stator and a second rotor. The second opening may be in the second stator, and the second stator may be at an opposite end of the detonation chamber. The second rotor generally has one or more fourth openings therein configured to overlap with the second opening.

A further aspect of the present invention relates to a hybrid internal detonation-turbine engine, comprising an internal detonation engine; a shaft; one or more rotary fans rotatably fixed to the shaft, upstream from the first stator and first rotor; and one or more turbine fans rotatably fixed to the shaft, downstream from the internal detonation engine. The turbine fan(s) and the shaft are generally configured to drive an air compression function of the rotary fan(s).

In a further aspect, the present invention also relates to a method of converting energy, comprising introducing a fuel into a detonation chamber through at least a first opening in a stator at an end of the detonation chamber; igniting or detonating a fuel in the detonation chamber; exhausting detonation gas(es) through a second opening in either the stator or the detonation chamber; converting energy from igniting or detonating the fuel to mechanical energy at one or more shafts, wheels, or gears; and rotating a rotor adjacent to the stator. The rotor has one or more third openings therein configured to overlap with at least the first opening as the rotor rotates, and otherwise seal the first opening when the third opening(s) do not overlap with the first opening.

The present invention improves on the performance of existing turbofan and gas turbine engines by integrating the element of pulse detonation into a general turbine engine design, resulting in a novel hybrid gas turbine engine. The novel hybrid gas turbine engine may have improved efficiency, and thus reduced fuel consumption and/or greater power generation in comparison to existing gas turbine technologies. In a pulse detonation engine, a flammable mixture of air and fuel in a detonation chamber are ignited in a supersonic detonation. The detonation may increase the gas pressure in the chamber to a range of about 50 atm to about 150 atm. The hot, pressurized gas may then be expelled through a nozzle to drive turbine rotors and/or create thrust. The novel hybrid gas turbine engine of the present invention includes a pulse detonation chamber in a detonation section of the engine. The novel gas turbine may additionally include conventional gas turbine combustion chambers.

The novel combination of a pulse detonation chamber incorporated into a gas turbine design increases the amount of mechanical energy and thrust that can be harnessed per unit of fossil fuel or bio-fuel. More specifically, the addition of the pulse detonation chamber increases the force and impulse (and specific impulse) delivered to the turbine section in comparison to conventional gas turbine and turbofan engines. Thus, the present hybrid gas turbine may produce greater amounts of power than a conventional gas turbine with the same or a smaller amount of fuel. The present technology can be used with a number of fuel sources, including natural gas, syngas, coal-derived $H_2$, petroleum fuel products (e.g., gasoline, kerosene, jet fuel, diesel fuel, etc.), ammonium nitrate, nitrous oxide, nitromethane, ethanol, bio-fuels, and other fuels. Other sources of materials that can be used to generate the present hybrid gas turbine include gunpowder, sawdust, straw, paper (e.g., ground, chopped, shredded, etc.), and/or other inexpensive, renewable fuel sources. In some embodiments, a combination of fuels can be used in the hybrid gas turbine engine in order to optimize performance. For example, gasoline can be used to start up the engine, and subsequently natural gas or jet fuel can be substituted for the gasoline when the engine is up to operational speed.

In further embodiments, the novel gas turbine engine can be adapted to power generation or other mechanical drive applications (e.g., ground vehicles). For instance, the present invention advantageously provides a hybrid gas turbine engine that can be used in conventional electrical power generation. The spinning shaft of the turbine can be used to drive an electricity generator. Thus, the novel gas turbine can be integrated into conventional electricity power generation systems without special design changes or excessive cost.

Additionally, the novel hybrid gas turbine can be manufactured using similar materials and parts used in conventional gas turbines, and thus the cost of manufacturing may be substantially the same as that of conventional gas turbines. These and other advantages of the present invention will become readily apparent from the detailed description of preferred embodiments below.

BRIEF DESCRIPTION OF THE DRAWINGS

FIG. 3 is a cross-sectional view of a hybrid gas turbofan turbine engine according to one embodiment.

FIG. 4 is a diagram showing a stator plate and a corresponding rotor according to one embodiment of the present invention.

FIG. 5 is a diagram providing anterior and profile views of a halved stator according to the present invention.

FIG. 6A is a diagram providing an anterior view of a paired stator and rotor according to one embodiment of the present invention.

FIG. 6B is a diagram providing an anterior view of an alternative paired stator and rotor according to another embodiment of the present invention.

FIGS. 18A-C are diagrams of the rotating valve and spring-loaded seal assembly according to one embodiment of the present invention.

DETAILED DESCRIPTION

Figure 1:
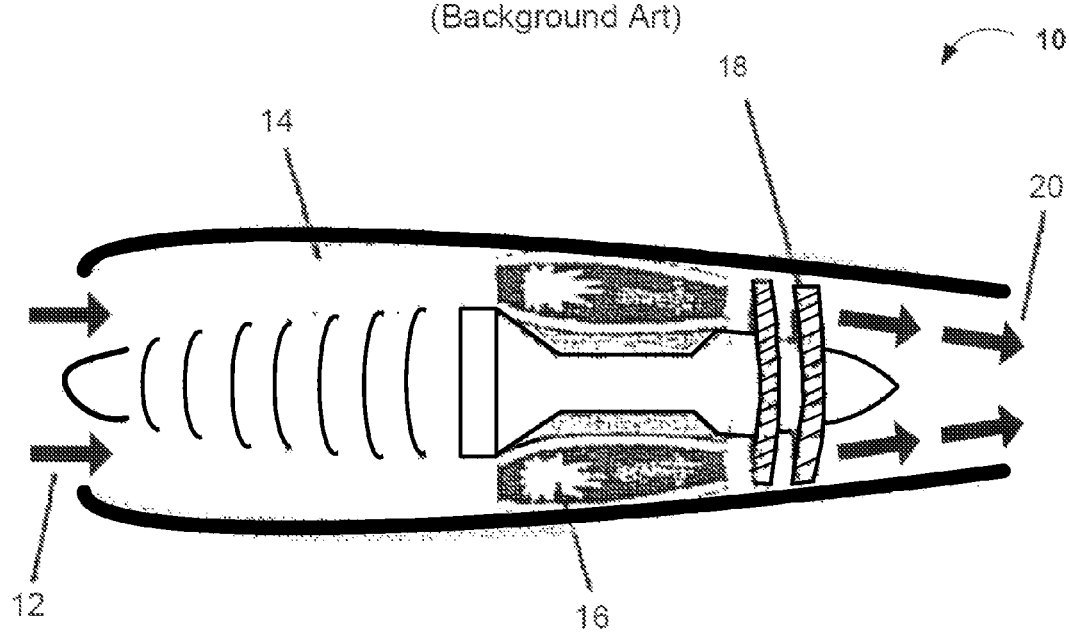
FIG. 1 is a cross-sectional view of a conventional gas turbine engine.
Figure 2:
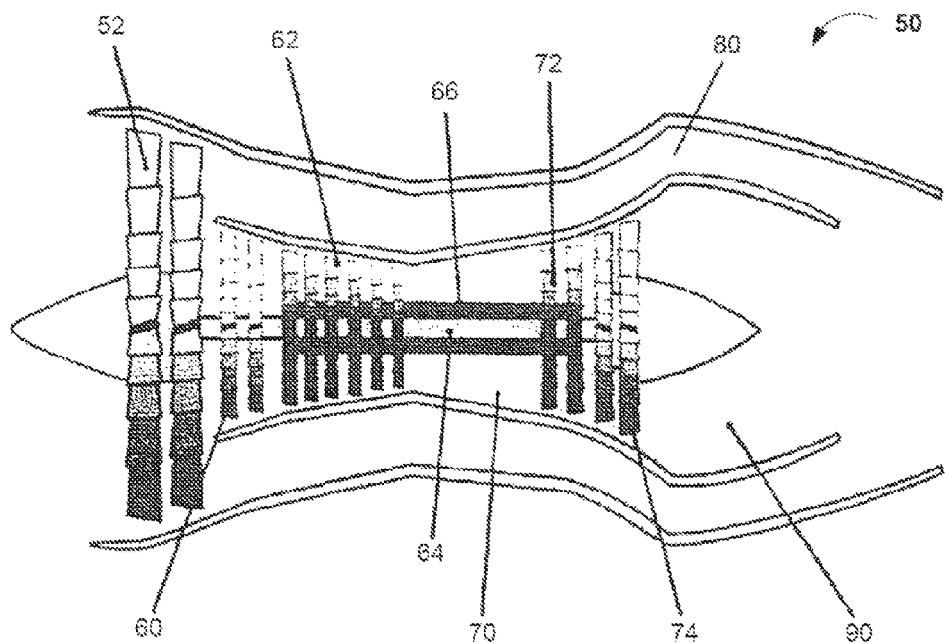
FIG. 2 is a cross-sectional view of a conventional turbofan gas turbine engine.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and materials have not been described in detail so as not to unnecessarily obscure aspects of the present invention.

Thus, the technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise. Each characteristic is generally only an embodiment of the invention disclosed herein.

Embodiments of the present invention relate to hybrid gas turbine engines, and methods of making and using the same. The hybrid gas turbine engine includes a gas turbine design that incorporates one or more pulse detonation chambers that can be closed during a detonation reaction, thereby providing additional force for driving a turbine and/or creating thrust.

An Internal Detonation Engine

As shown in FIG. 3, a hybrid internal detonation-gas turbine 100 generally comprises four sections, (1) a compressor or compressor section 120, (2) a detonation section 130 having one or more pulse detonation chambers 135, (3) a turbine section 140, and (4) an exhaust section 150. An afterburner may be optionally included in the hybrid internal detonation-gas turbine engine to increase thrust in aircraft applications. The hybrid internal detonation-gas turbine engine may provide increased force, impulse, and/or specific impulse to the turbine blades, thereby increasing the efficiency and power output of the engine.

Referring to FIG. 3, in an exemplary embodiment of the present invention, a novel hybrid turbofan gas turbine engine 100 is shown that can be used as a propulsion system for an aircraft and other vehicles. The hybrid gas turbine design can be constructed in a wide range of sizes (e.g., engines having a diameter in a range of about 3 inches to about 15 feet, or any value or range of values therein). In addition, the hybrid turbofan gas turbine engine 100 may have a number of applications, including model vehicles (e.g., air, water, and ground unmanned vehicles) and air, water, and ground passenger vehicles (e.g., commercial aircraft).

In various embodiments of the present invention, the engine 100 may include a fan 105 at the front (anterior) of the engine 100, where influent air is received by the engine 100. The fan 105 is configured to increase the velocity of influent air, which is passed by the fan 105 to two separate structures that are behind or posterior to the fan, a fan duct 110 and the compressor or compressor section 120. The fan 105, the fan duct 110, and the compressor 120 may be configured such that about 5 to 95% of the influent air is passed into the compressor section 120 of the engine 100 (e.g., about 10% to 75%, 15% to 50%, 20% to 40%, or any value or range of values therein). The remainder of the influent air may be passed into the fan duct 110. The fan 105 may have a diameter in a range of about 2 inches to about 14 feet (e.g., about 1 foot to 10 feet, 2 to 8 feet, 3 to 6 feet, or any value or range of values therein), depending on the overall size of the hybrid internal detonation-gas turbine engine 100. The fan 105 may be configured to spin at about 500 to about 7500 rpm (e.g., about 1000 to about 5000 rpm, about 1500 to about 3500 rpm, or any value or range of values therein), and thereby increase the velocity of the influent air passing to the fan duct 110 and the compressor 120 to a speed of about 50 mph to about 1500 mph (e.g., preferably about 200 mph to about 700 mph, or any value or range of values therein).

The fan duct 110 receives influent air from the fan 105 and passes it around the compressors 120 and the detonation chamber 135 to the exhaust section 150 of the hybrid internal detonation-gas turbine engine 100 where it provides thrust via a nozzle 155. The fan duct 110 may have a varied cross-sectional area along its length to maximize thrust as air is expelled into the exhaust section 150.

In some embodiments, the hybrid internal detonation-gas turbine engine 100 may not include an anterior fan. For instance, hybrid gas turbines designed for power generation may not include such a fan structure. In such embodiments, the diameter of hybrid internal detonation-gas turbine engine in the detonation section 130 may be occupied with one or more detonation chambers 135, and optionally one or more conventional combustion chambers (not shown), in order to maximize the force and impulse that can be generated by the detonation section 130 of the hybrid internal detonation-gas turbine engine 100.

The compressor section 120 also receives influent air from the fan 105, and passes it through one or more compressor rotors 124 to increase the pressure and temperature of the influent air. Influent air may be passed from the fan 105 into an axial duct 115 in which the compressor section 120 is located. The compressor or compressor section 120 may have 1 to 15 stages, where each stage may include a compressor rotor 124 and a spacer (not shown). Each rotor 124 includes a set of radially-oriented metal blades (e.g., stainless steel, titanium, etc.) that spin at high velocity during operation and accelerate the influent air as it passes through the compressor 120. Each stage may optionally have a stator 136a or 136b in addition to or instead of the spacer, which may have blades or ducts for guiding the flow of the influent air.

The compressor 120 may include one or more stages (e.g., characterized and/or defined by compressor blades 122 and 124) making up a low pressure compressor section, and one or more stages (e.g., characterized and/or defined by compressor blades 126) making up a high pressure compressor section. The stages of the low pressure compressor section may be connected to a first (e.g., "low pressure") shaft 132, which may also be connected to low pressure stages 144 in the turbine section 140 of the engine 100. The fan 105 may also be connected to the low pressure shaft 132. The combination of the fan 105, the low pressure compressor in the compressor section 120, the low pressure turbine section, and the low pressure shaft 132 make up a low pressure spool. The compressor 120 may also include one or more stages making a high pressure compressor section 120 that may be coupled to a second (e.g., "high pressure") shaft 134 and a high pressure section of the turbine (e.g., characterized and/or defined by turbine blades 142) to make up a high pressure spool. The spin of the low pressure compressor section may be driven by the low pressure turbine, and the spin of the high pressure compressor section may be driven by the high pressure turbine section.

The compressor 120 may be configured to increase both the pressure and temperature of the influent air passing through the compressor 120. The spinning rotors 122-126 of the compressor 120 increase the speed of the air introduced into the compressor 120 by the fan 105. The metal blades of the compressor rotors 122-126 push the air toward the detonation section 130 of the engine as the compressor rotors 122-126 spin. The axial duct 115 may also contribute to the compression of the air as the duct decreases in diameter as it gets closer to the detonation section 130 of the engine. However, there may be a compressed air reservoir (not shown) in the compressor section 120 adjacent to the detonation section 130 that may have a volume that is several times larger than the volume of the detonation chamber 135, which may improve performance and engine stability (e.g., reduce vibration).

The pressure of the compressed air delivered by the compressor 120 to the detonation chamber 135 (and combustion chambers in some embodiments) may be increased to be in a range of about 2 atm to 50 atm (e.g., about 10 atm to about 35 atm, about 15 atm to about 25 atm, or any value or range of values therein). The temperature of the compressed air delivered to the combustion chamber may be in a range of about 250° C. to about 1250° C. (e.g., about 500° C. to about 1000° C., or any value or range of values therein). The compressed air may be delivered into the combustion section 130 of the engine by the axial duct 115, as shown in FIG. 3. In alternative embodiments (e.g., in embodiments in which the combustion section has multiple pulse detonation chambers 135 or a combination of pulse detonation chambers 135 and combustion chambers), the compressed air may be delivered via a diffuser manifold. The diffuser manifold may have a plurality of ducts, each duct corresponding to a separate pulse detonation chamber 135 or combustion chamber.

As shown in FIG. 3, the hybrid internal detonation-gas turbine engine 100 includes the detonation section having the pulse detonation chamber 135 therein. However, the present embodiments are not limited to the hybrid internal detonation-gas turbine engine 100 shown in FIG. 3, and may include one or more pulse detonation chambers 135. Each pulse detonation chamber 135 may include one or more fuel injectors for introducing a fuel source 137 into the pulse detonation chamber 135. Where multiple fuel injectors are present in a pulse detonation chamber 135, each fuel injector may introduce a same or different kind of fuel (e.g., a first fuel injector may inject gasoline, a second injector may inject jet fuel, a third injector may inject natural gas, etc.). One or more igniters 137 (e.g., spark plugs) may be present in each pulse detonation chamber 135 for igniting the air-fuel mixture. Also, each pulse detonation chamber 135 has a front door assembly and a rear door assembly, where each assembly includes a first paired stator 136a and rotor 138a and a second paired stator 136b and rotor 138b for controlling the influx and expulsion of gas in the chamber (e.g., detonation chamber 135).

FIG. 4 shows a stator plate 136' and a corresponding rotor 138'. Thus, an exemplary stator 136' and rotor 138' pair or set is shown in FIG. 4. In the front door assembly, the stator 201 has one or more openings or rotor voids 203 that may allow the flow of compressed air from the compressor into the detonation chamber (e.g., detonation chamber 135 of FIG. 3). The shape of the rotor 202 may be fabricated to correspond to the shape of the rotor void 203, such that when the rotor 202 rotates, the rotor 202 will fully cover the rotor void 203 at rotational positions and prevent the passage of compressed air during the certain portion of the rotational cycle. Thus, the rotation of the front door rotor controls the flow of compressed air from the compressor (e.g., compressor 120 of FIG. 3). In the rear door assembly, the rotor 138' and stator 136' are built in the same fashion. The rotation of the rear door rotor 138' controls the flow of the hot, pressurized gas from the detonation chamber(s) (e.g., detonation chamber 135 of FIG. 3) to the turbine section (e.g., turbine section 140 of FIG. 3) of the engine (e.g., engine 100 of FIG. 3).

The front door and rear door assemblies may each include a ring or gasket 204 around the edges of the void rotor 203 to create a tight seal between the stator 201 and rotor 202. The ring or gasket 204 may be lubricated to improve the seal between the stator 201 (or the ring or gasket 204) and rotor 202. Also, the stators 136' and rotors 138' may be made from the same material, such as heat- and pressure-resistant material (e.g., stainless steel, titanium, etc.). Alternatively, the stators 136' and rotors 138' may each comprise a different heat- and pressure-resistant material.

As shown in FIG. 5, the stators may have a canister-like construction. FIG. 5 provides both an anterior view of a halved stator 236' and a side view of a halved stator 236'. The stator 236 may have a base plate 204 in which the void spaces 203 are formed, a solid cylinder may be attached to or formed with the base plate 204, and a ring may be attached to or formed with the upper rim of the cylinder and lying in a parallel plane to the base plate 204. The ring may be used as an attachment point between the stator 236 and other structures in the gas turbine engine (e.g., the ring of one stator may be bolted to the ring of another stator, see, e.g., FIG. 9). The base plate 204 of the stator 236 may have a radius of about 1 inch to about 10 feet (e.g., about 1 foot to about 6 feet, or any value or range of values therein).

The number of rotor voids 204 in a stator 236 may vary. In various embodiments, the stator 236 may have 1-100 (e.g., 4-20, or any value or range of values therein) rotor voids 203, depending upon the size of the hybrid turbine engine, and the particular application of the engine. The size and number of the rotor voids 203 may vary. A greater number of rotor voids 203 may result in less vibration in the engine and more engine stability. Each stator 236 may also have a central round void for the axial shaft (e.g., axial shafts 132 and/or 134, FIG. 3) of the turbine engine (e.g., hybrid engine 100, FIG. 3).

Referring back to FIG. 4, the rotor voids 203 may have a wedge shape (see, e.g., FIG. 5), where the length of the rotor void (i.e. the radial length from the axial shaft) may extend nearly to the circumference of the base plate 204, and the width of the rotor void 203 may vary, depending on the distance from the axial shaft (e.g., axial shafts 132 and/or 134, FIG. 3). The width of the rotor voids may be better characterized by the degree of arc occupied by the void 203 on the plane of the base plate 204. The rotor voids 203 may occupy a degree of arc of about 1° to 270° (e.g., 5° to 90°, or any degree or arc therein), depending on the number of rotor voids 203 and radius of the base plate 204. Alternatively, the rotor voids 203 may have other appropriate shapes, such as circular, oval, Reuleaux polygonal, etc.

The rotors 236 may be attached to the axial shaft (e.g., axial shafts 132 and/or 134, FIG. 3) or high spool, and include one or more blades radially extending from the axial shaft or high spool. The number (e.g., 1-100, or any number therein), shape (e.g., a wedge shape, round, oval, etc.), and spacing of the rotor blades 202 (FIG. 4) may correspond to the rotor voids 203 in the paired stator 136'. Thus, the rotor 138' may completely cover the rotor voids 203 in the stator 236 when the rotor blades 202 are aligned with the rotor voids 203. In some embodiments, the rotor blades 202 may occupy a greater degree of arc than the rotor voids 203.

In order to facilitate continuous operation of the detonation chamber (e.g., detonation chamber 135 of FIG. 3), there may be (1) a size difference between the rotor blades 202 (FIG. 4) and the rotor voids 203, and (2) a phase shift (a staggered arrangement) between the rotor operation of the front door assembly and rear door assembly in order to accommodate an open and close sequence that allows the detonation of an air-fuel mixture in a closed detonation chamber and the subsequent expulsion of the hot, pressurized air-fuel mixture.

FIG. 6A shows a paired stator 236a and rotor 238a. As shown in FIG. 6A, the stator 236a may have four rotor voids (e.g. voids 203 of FIG. 5) having a degree of arc of 1° to 22.5° (e.g., 22.5°, or any degree of arc or range of degrees therein), and the rotor 238a may have four rotor blades having degrees of arc equal to or greater than the rotor voids (e.g., greater than 1° to 89°, 30° to 60°, 45°, or any degree or range of degrees therein). The front and rear rotors (e.g., rotors 138a and 138b in FIG. 3, respectively) may be staggered by a degree of arc of about 1° to about 45° (e.g., by 22.5°).

In another embodiment, shown in FIG. 6B, a paired stator 236b may have one rotor void 203' having a degree of arc of 1° to 180° (e.g., 90°, or any degree of arc or range of degrees therein), and the rotor 238b may have a single blade having a degree of arc equal to or greater than the rotor void 203' (e.g., greater than 1° to 359°, 90° to 270°, 180°, or any degree or range of degrees therein). The front and rear rotors (see, e.g., rotors 138a and 138b in FIG. 3) may be staggered by a degree of arc of about 1° to about 90° (e.g., by 90°).

The front and rear rotors (e.g., rotors 138a and 138b) may be attached directly to the axial shaft (or a high spool, such as the shaft [s] 132 and/or 134 in FIG. 3), and thus may spin in the same direction (e.g., clockwise) and at the same speed as the axial shaft (or the high spool). However, in alternative embodiments, the rotors may be indirectly coupled to the axial shaft (or high spool) via a gear system or other mechanical devices interposed between the rotors and the axial shaft (or high spool). For instance, a reverse idler gear (not shown) may be interposed between the axial shaft (or high spool) and the rotor to change the direction of rotor spin relative to the axial shaft. Also, the size of a gear that is attached to the rotor and coupled to the axial shaft (or an idler gear therebetween) may be adjusted to create a desired gear ratio (e.g., the ratio of the angular velocity of the input gear to the angular velocity of the output gear) of the axial shaft to the rotor, and thereby adjust the speed at which the rotor spins.

In further alternative embodiments, the one or both of the rotors 238a and/or 238b (FIGS. 6A-B) may spin independently of the axial shaft (e.g., shaft[s] and/or axle[s] 132 and/or 134 of FIG. 3). In such embodiments, the rotors 238a and/or 238b of FIGS. 6A-B may be controlled by a separate mechanical driving mechanism. Accordingly, the rotors 238a and/or 238b may move from a closed position to an open position independently of one another. For instance, a rotor 238a as shown in FIG. 6A may start in a closed position, and then be rotated in one direction (e.g., clockwise) by a predetermined angle (e.g., equal to the angle of the corresponding void 203') to an open position. Subsequently, the rotor 238a of FIG. 6A may be spun in the opposite direction (e.g., counterclockwise) by the same angle to return the rotor 238a to the closed position.

Figure 7:
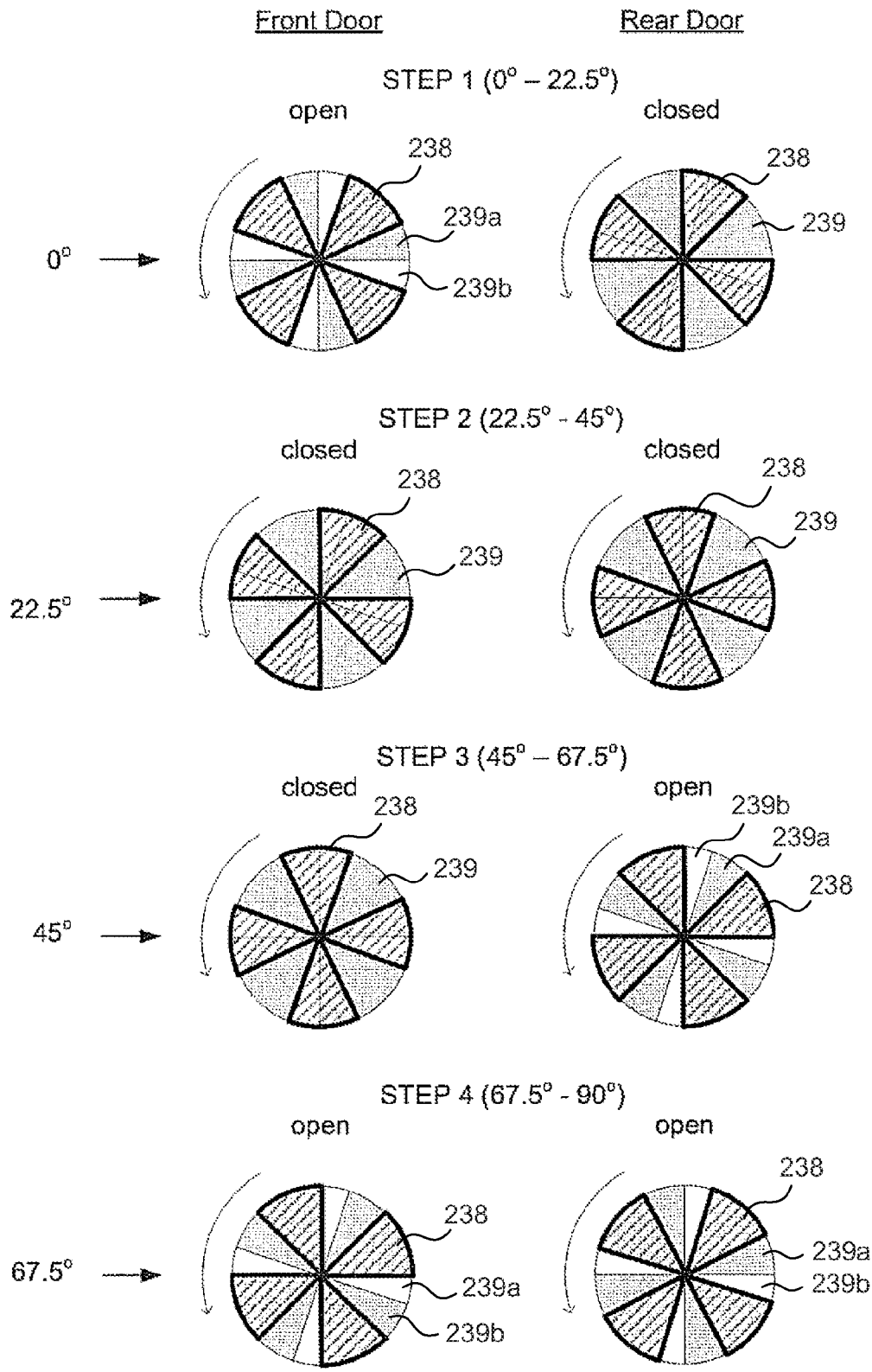
FIG. 7 is diagram showing the rotor positions of a front door assembly and a back door assembly during a 4-step detonation process.

FIG. 7 shows the rotor positions of the front door assembly and the backdoor assembly during a four step detonation process. The staggering of the rotors 238a and 238b and/or the independent rotation of the rotors 238a and/or 238b may be employed to create a multistage detonation cycle in which the front and back door assemblies are programmed to be open or closed in a predetermined sequence. The positions (closed and open) of the front and rear rotors 238a and 238b can be controlled to optimize the force produced by the detonation and applied to the turbine rotors 238a and 238b, thereby improving the thrust and/or torque of the engine. In some embodiments, the staggered arrangement of the rotors 238a and 238b and/or stators 236a and 236b allows for four sequential steps of operation as the rotors 238a and 238b rotate with the turbine shaft (e.g., shaft and/or axle 132 and/or 134 of FIG. 3). Similarly to a four-stroke internal combustion engine, the rotation of the rotors 238a and 238b of FIG. 7 creates four basic steps that repeat as the rotors 238a and 238b rotate. The four steps of the detonation process are summarized in the following table:

TABLE 1

|  |  | Front Door Assembly | Rear Door Assembly |
|---|---|---|---|
| Step 1 | Compressor air and fuel enter the chamber | Open | Closed |
| Step 2 | Detonation of the fuel/air mixture | Closed | Closed |
| Step 3 | Hot, pressurized air flows out | Closed | Open |
| Step 4 | Compressor air flushes out the chamber | Open | Open |

In Step 1, compressed air passes from the compressor into the detonation chamber (e.g., detonation chamber 135 in FIG. 3). During Step 2, the ignition of the air-fuel mixture in the detonation chamber results in a supersonic detonation pulse, which is then exhausted from the detonation chamber in Step 3. The rapidly exploded gas that is exhausted during step 3 delivers substantial force to the turbine rotors (e.g., rotors 142 and/or 144 in FIG. 3) in the turbine section of the hybrid internal detonation-gas turbine engines, and drives the rapid rotation of the turbine rotors. The supersonic detonation may provide substantially more force per unit fuel (improved specific impulse) than a conventional combustion chamber in a conventional turbofan engine. During Step 4, both the front and rear door assemblies are open to flush out any residual gas from the detonation.

Figure 8:
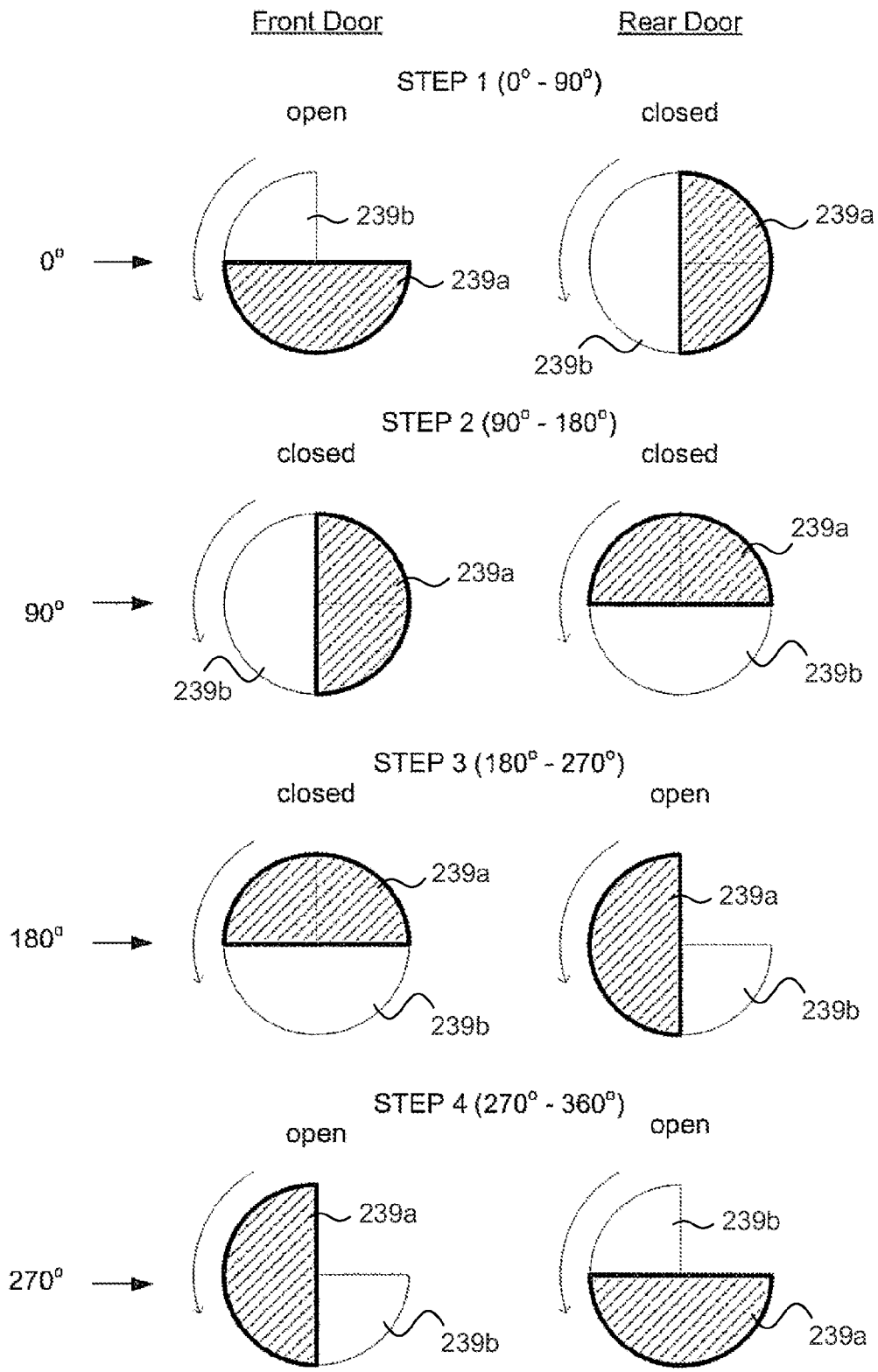
FIG. 8 is diagram showing the rotor positions of an alternative front door assembly and a back door assembly during a 4-step detonation process.

The movement of the rotors 238a, 238b in relation to the stators 236a, 236b during the detonation process is exemplified by FIGS. 7 and 8, which show the alignment of rotors 238a, 238b and stators 236a, 236b during Steps 1-4 described above. FIG. 7 shows rotors 238a, 238b and stators 236a, 236b like those of FIG. 6A, where there are 4 rotor blades (e.g., each have a degree of arc of 45°) on each rotor 238a, 238b and 4 rotor voids 203', 203" (e.g., each having a degree of arc of 22.5°) in each stator 236a, 236b. FIG. 8 shows rotors and stators like those of FIG. 6B, where there is one rotor void (e.g., having a degree of arc of 90°) and one rotor blade (e.g., having a degree of arc of 180°).

FIGS. 7 and 8 show examples in which the front and rear rotors 238a, 238b spin in the same direction (e.g., both rotors 238a, 238b spin counterclockwise if viewed from the front of the engine). As explained above, the rotors 238a, 238b may have varying arrangements in which the rotors 238a, 238b spin in opposite directions and/or at different speeds.

Other rotor/stator arrangements are included in the present invention. For example, each rotor 238a or 238b may independently have 1 to 100 rotor blades, and each corresponding stator 236a or 236b may have a corresponding number of rotor voids 203' or 203". Thus, each rotor/stator pair may have a different arrangement and number of rotor blades and rotor voids 203' or 203". Additionally, the shapes of the rotors 238a and 238b and rotor voids 203' and 203" may vary between different rotor/stator pairs in the same engine. The arrangements, numbers, and shapes of rotor blades and rotor voids may be optimized for each rotor/ stator pair in order to maximize the force and impulse of the hybrid internal detonation-gas turbine engine. The rotors and stators may be located in the central portion of the hybrid turbine engine, generally at or near where conventional combustion chambers would be located (see, e.g., FIG. 3). The arrangement of the stators and rotors may be fixed in relation to the length of the turbine axle.

Figure 9:
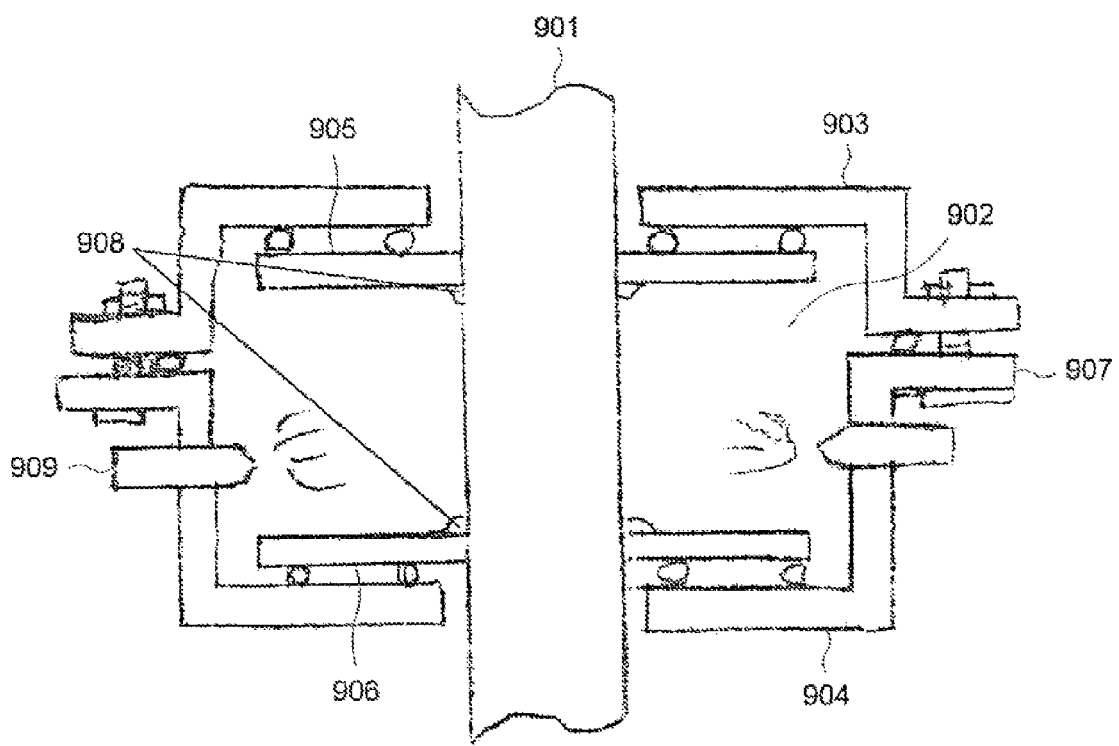
FIG. 9 is a diagram of a detonation chamber according to one embodiment of the present invention.

For example, FIG. 9 shows a front stator 903 and a rear stator 904 that may be stationary at the ends of a detonation chamber 902, and may be coupled to the body of the hybrid turbine engine at attachment points 907, but the stators 903, 904 are not coupled to an axial shaft 901. The stators 903, 904 can be attached to one another (e.g., bolted together with "O" rings therebetween) to seal the detonation chamber 902. The front rotor 905 and rear rotor 906 may be attached to the axial shaft 901 (or the high spool) so that the rotors 905, 906 are driven (spun) by the turbine (e.g., the high pressure turbine) during operation of the hybrid internal detonation-gas turbine engine. Front rotor 905 and rear rotor 906 are attached (e.g., welded) to the axial shaft 901 at attachment points 908. Each detonation chamber 902 may include a fuel injection/igniter 909.

Figure 10:
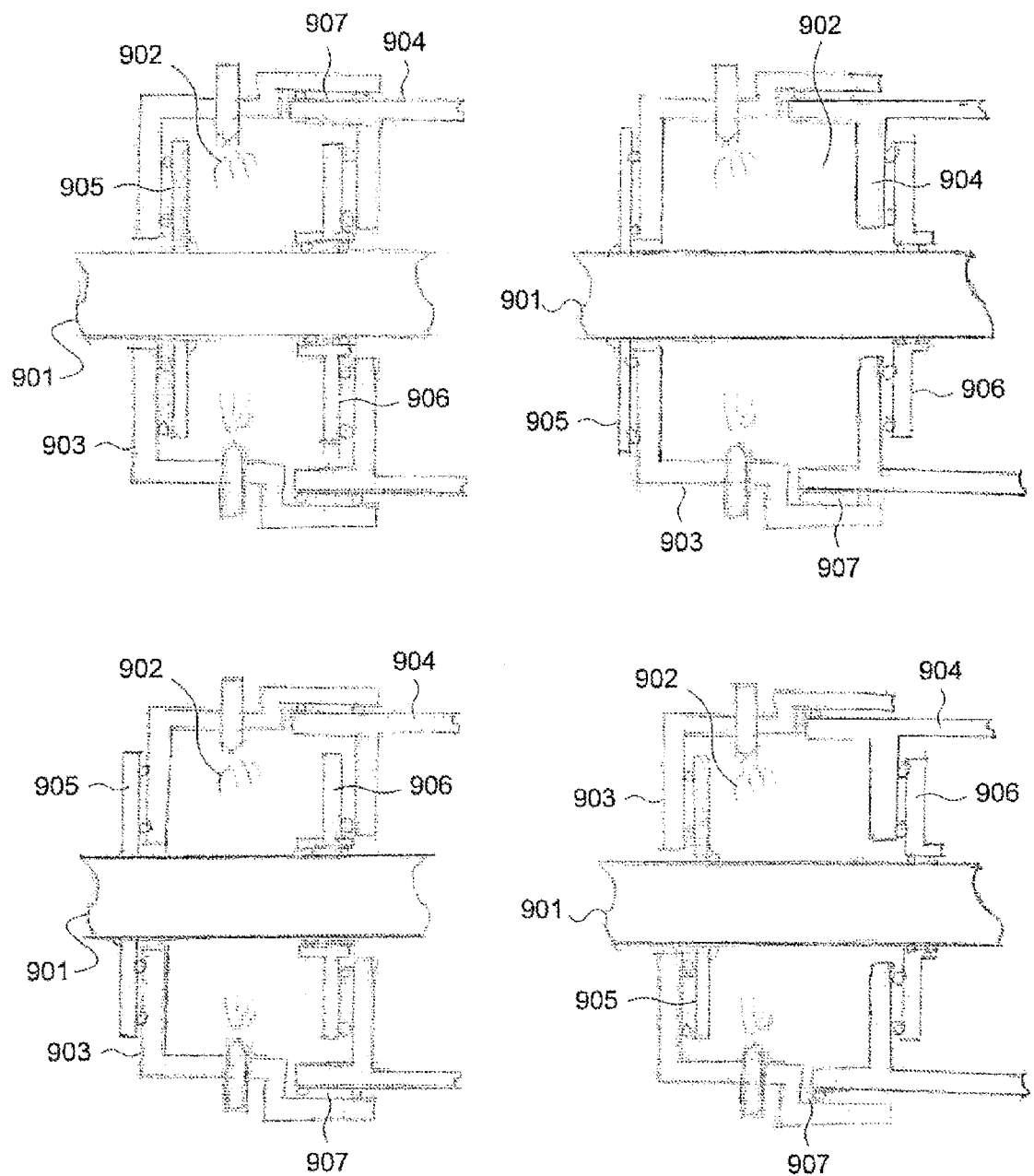
FIG. 10 is a diagram showing four stator and rotor arrangements for a detonation chamber suitable for use in the present invention.

As shown in FIG. 10, the stators 903, 904 and rotors 905, 906 may have multiple arrangements. As the four examples of FIG. 10 show, the front rotor 905 and the rear rotor 906 can be either on the interior or the exterior of the detonation chamber 902.

During Step 1 of the detonation sequence, the front rotor 905 may be out of alignment with rotor voids in front stator 903, and rear rotor 906 may be aligned with rear stator 904, allowing compressed air from the compressor into the detonation chamber 902. During Step 2 (detonation phase), the front rotor 905 may be aligned with the rotor voids in front stator 903, and the rear rotor 906 may be aligned with rear stator 904, thereby closing the detonation chamber 902. Fuel may be introduced into the detonation chamber 902 during Step 1 and/or Step 2 prior to ignition of an air-fuel mixture of the compressed air and the fuel by ignition sources 909 (e.g., spark plugs). The ignition of the air-fuel mixture results in detonation and a resulting hot, pressurized gas mixture in the detonation chamber 902. During Step 3, the front rotor 905 may be aligned with rotor voids in front stator 903, and rear rotor 906 may be out of alignment with rear stator 904, allowing the hot, pressurized gas created by the detonation to be exhausted through the rotor voids in rear stator 904 and into the turbine section of the hybrid turbine engine (see, e.g., FIGS. 3 and 9). During Step 4, both rotors 905, 906 are out of alignment with their respective stators 903, 904 to allow the residual gas in the detonation chamber 902 to be flushed out.

In an alternative embodiment, the front door assembly may be as described above, but the rear door assembly may be constructed to enable a piston-like action during the detonation of the air-fuel mixture (Step 2). In embodiments where the rear door assembly may be constructed to enable a piston-like action, the rear stator 1104 may be coupled to a mechanism for driving the axial shaft 1101 and/or other mechanical processes, devices, or apparatuses.

Figure 11:
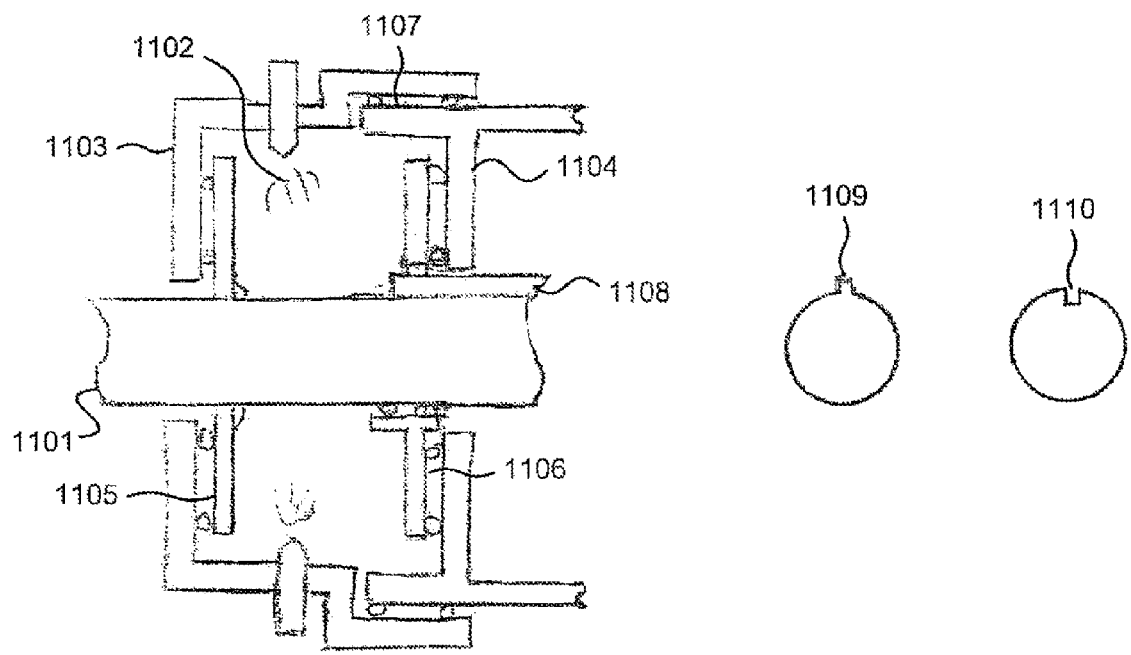
FIG. 11 provides diagrams illustrating yet another detonation chamber according to one embodiment of the present invention.

As shown in FIG. 11, a front rotor 1105 is attached to an axial shaft 1101 at the front of a detonation chamber 1102. A front stator 1103 is attached to the body of the hybrid turbine engine at the anterior end of the detonation chamber 1102. However, the rear door assembly differs from the embodiment of FIG. 9. A rear stator 1104 is attached to the body of the hybrid turbine engine (or the front stator 1103) by a sliding means 1107 (e.g., one or more linear bearings), allowing it to slide along the axial shaft 1101. There may be a tight seal between the front stator 1103 and the rear stator 1104, even though the rear stator is not stationary. Also, the rear rotor 1106 is attached to the axial shaft 1101 by a sliding means 1108 (e.g., one or more linear bearings), allowing the rear rotor 1106 to slide along the axial shaft 1101. This arrangement allows the rear stator 1104 and rear rotor 1106 to move along the axial shaft like a piston during the detonation phase of operating the engine. When the air-fuel mixture within the detonation chamber is ignited, the detonation may push the rear door assembly (rear stator 1104 and rear rotor 1106) along the shaft 1101 toward the rear of the engine. The axial shaft 1101 may have a bar 1109 or a groove 1110 running along the axial shaft 1101 and parallel to the axis of the axial shaft 1101 in order to guide the rear rotor 1106 as it moves along the axial shaft. Both the rear stator 1104 and the rear rotor 1106 may have a return mechanism (not shown) to return the rear stator 1104 and the rear rotor 1106 up the axial shaft 1101 to their pre-detonation positions (e.g., a spring system, a hydraulic resistance system, etc.). In embodiments where the rear rotor 1106 is within the detonation chamber, the rear stator 1104 may have a return mechanism and the rear 1106 may be pushed back into pre-detonation position by the rear stator 1104.

Figure 12:
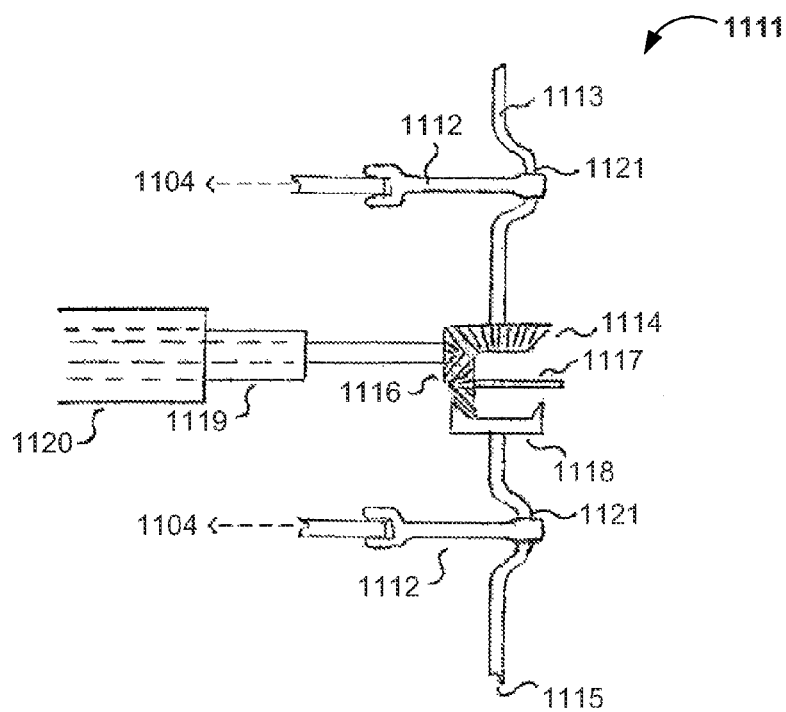
FIG. 12 is a diagram of a crankshaft assembly according to one embodiment of the present invention.

FIG. 12 shows a crank assembly 1111 that can be attached to the rear door assembly (e.g., rear stator 1104) and located in or near the turbine section (e.g., turbine section 140 of FIG. 3) of the hybrid turbine engine. The rear door assembly may be connected to connecting rods 1112 (FIG. 12), which spin crankshafts 1113 as the rear door assembly moves back and forth along the axial shaft 1101. As the crankshafts 1113 spin, driving gears 1114 and 1118 attached to the crankshafts 1113 drive the follower gear 1116 on the axial shaft 1101, thereby causing the axial shaft 1101 to spin. A reverse idler gear 1117 may be interposed between driving gear 1118 and follower gear 1116 in order to complement the spin of driving gear 1114 and allow the axial shaft 1101 to spin smoothly and continuously. For example, if the follower gear 1116 is being driven to spin in a clockwise direction by the driving gear 1114, the reverse idler gear 1117 is spun counterclockwise by driving gear 1118, which in turn also drives the follower gear 1116 in the clockwise direction. The gear ratios between (1) the driving gears 1114 and 1118 and (2) the follower gear 1116 can be adjusted to optimize operation of the hybrid internal detonation-gas turbine engine (e.g., to maximize the speed at which the axial shaft rotates, to provide smooth and coordinated operation of turbine and piston system, etc.). For example, the gear ratio of the driving gears 1114 and 1118 to the follower gear 1116 may be from about 0.1 to about 20 (e.g., about 0.5 to about 10, about 1 to 5, or any ratio or range of ratios therein). Alternatively, the crankshafts 1113 may drive a more complicated system of gears in a gear box (not shown) that, in turn, drives the axial shaft 1101. The crankshaft 1113 may also be coupled to other mechanical processes, devices, or apparatuses 1115, thereby providing multiple mechanical uses. In some embodiments, and somewhat similar to conventional internal combustion engines, multiple engines may drive a single crankshaft.

The axial shaft 1101 may be further coupled to a low spool shaft 1119 (e.g., connected to a low pressure turbine, a low pressure compressor, and a fan) and a high spool shaft 1120 (e.g., connected to a high pressure turbine and a high pressure compressor, and front and rear rotors). Alternatively, the axial shaft 1101 may serve as the low spool shaft, and may be coupled to a high spool shaft. Additionally, there may be gears interposed between the axial shaft 1101 and the low spool and high spool shafts 1119 and 1120, respectively, to adjust a gear ratio between the axial shaft 1101 and the low spool and high spool shafts 1119 and 1120. For example, the gear ratio between the axial shaft 1101 and the low spool shaft 1119 may be 0.1 to 20 (e.g., about 0.1 to about 15, about 1 to about 10, or any ratio or range of ratios therein), and the gear ratio between the axial shaft 1101 and the high spool shaft 1120 may be 0.01 to 20 (e.g., about 0.5 to about 5, about 0.1 to about 2, or any ratio or range of ratios therein). Alternatively, the low spool shaft 1119 may be separately coupled to both the low spool shaft 1119 and the high spool shaft 1120 by one or more gears. In such embodiments, the gear ratio of the low spool shaft 1119 to the high spool shaft 1120 may be about 0.01 to about 10 (e.g., about 0.05 to about 1, about 0.1 to about 2, or any ratio or range of ratios therein).

Also, the gear ratio of the driving gears 1114 and 1118 to the follower gear 1116, and the gear ratio of the axial shaft 1101 to the low and high spool shafts 1119 and 1120, respectively, may be coordinated to achieve a specific angular velocity relationships between these different rotating parts of the hybrid turbine engine (e.g., between the rear rotor [e.g., rotor 1106 of FIG. 11] and the high spool shaft 1120). The coordination of the angular velocities of the high spool shaft 1120 and the rear rotor (e.g., rear rotor 1106) allows the detonation cycle to proceed smoothly.

In one embodiment (where the detonation cycle and the stator/rotor arrangement are similar to those shown in FIG. 7), a gear ratio of the driving gears 1114 and 1118 to the follower gear 1116 in FIG. 12 is 1, the gear ratio of axial shaft 1101 to low spool shaft 1119 is 10, and the gear ratio of low spool shaft 1119 to high spool shaft 1120 is 0.1, thereby providing an angular velocity ratio of the high spool shaft 1120 to the rear rotor of 1 (which results in one detonation cycle for every 90° turn of the high spool and the rear rotor). In a further embodiment (e.g., where the detonation cycle and the stator/rotor arrangement are similar to those shown in FIG. 8), gear ratio of the driving gears 1114 and 1118 to the follower gear 1116 is 10, the gear ratio of axial shaft 1101 to low spool shaft 1119 is 2, and the gear ratio of low spool shaft 1119 to high spool shaft 1120 is 5, thereby providing an angular velocity ratio of the high spool shaft 1120 to the stators of 1. This embodiment results in one detonation cycle for each complete revolution of the high spool and the rear rotor (see, e.g., FIG. 7).

Additionally, in the embodiment of FIG. 12 (and similar embodiments where the rear door assembly may be constructed to enable a piston-like action) the connecting rods 1112 may serve as a return mechanism for the rear door assembly. In addition to or in place of the spring or hydraulic resistance systems discussed above, the connecting rods 1112 may push the rear door assembly back to its original position (pre-detonation position) as the crankshafts 1113 rotate. More specifically, as the connecting rod journals 1121 rotate toward a position closest to the detonation chamber, the connecting rod journals 1121 push the connecting rods 1112, which, in turn, push the rear door assembly (including stator 1104) back to its pre-detonation position.

Figure 13:
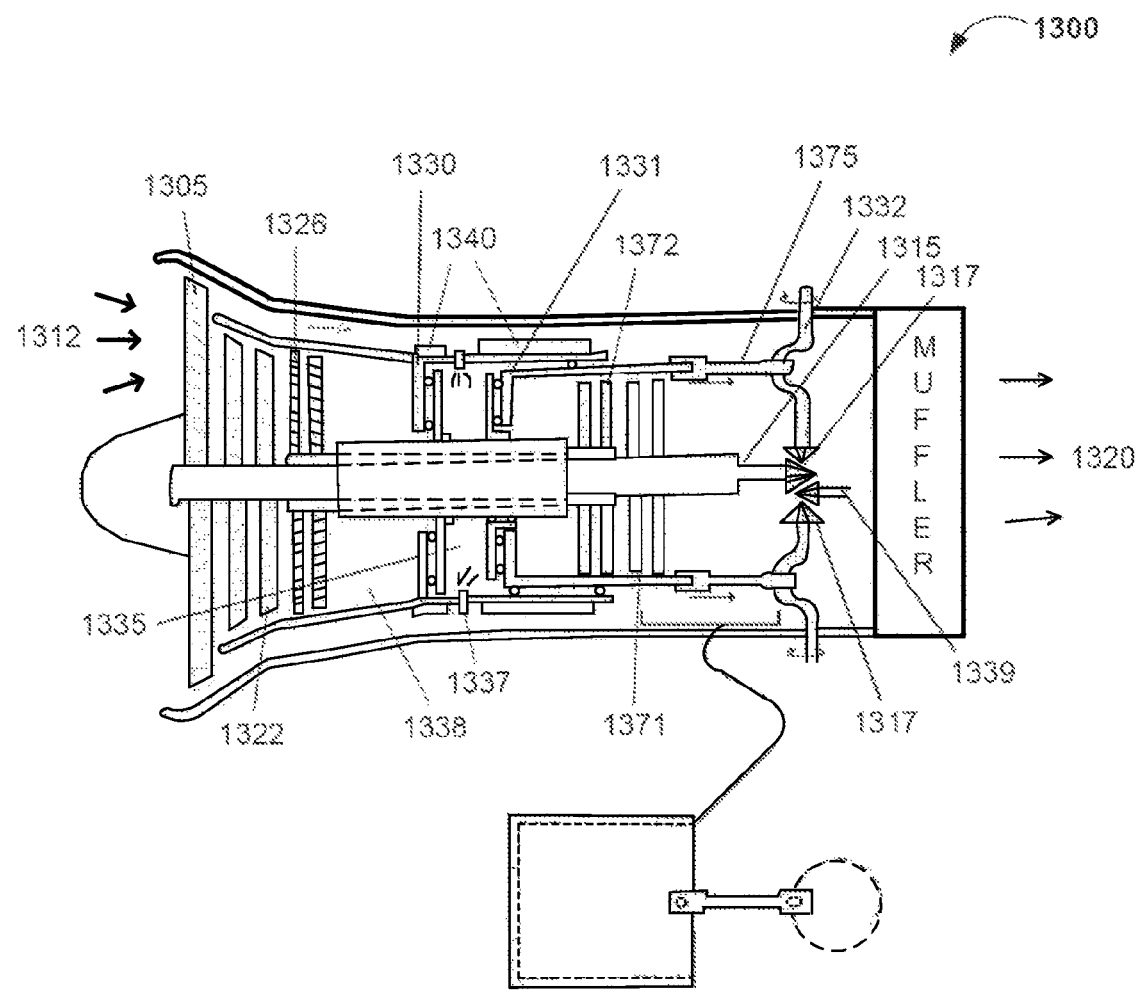
FIG. 13 is a cross-sectional view of a hybrid turbofan gas turbine engine according to one embodiment of the present invention.

FIG. 13 provides an example of a turbofan-like hybrid gas turbine engine 1300 that includes a piston-like action during the detonation phase. The detonation chamber 1335 in the hybrid gas turbine engine of FIG. 13 is like the one shown in FIG. 11. Air 1312 is injected into the intake to the turbofan-like hybrid gas turbine engine 1300. The fan 1305, the low and high-pressure compressors 1322 and 1326, front door assembly 1330, and low and high pressure turbines 1371 and 1372 are similar to their corresponding components in FIG. 3. The hybrid internal detonation-gas turbine engine of FIG. 13 may include a compressed air reservoir 1338 and cooling fan 1340. As the air-fuel mixture is ignited in the detonation chamber 1335 by a fuel injection/igniter 1337, the rear door assembly 1331 is pushed toward the rear of the hybrid turbine engine, as indicated by the arrows. As the rear door assembly 1331 moves posteriorly, the connecting rods 1375 spin the crankshafts 1332 and the driving gears 1317, which in turn drive the axial shaft 1315.

As mentioned above, the presently disclosed hybrid turbine engines may be used to propel vehicles, including ground vehicles (e.g., trucks, car, military tanks, etc.). In order to reduce the noise created by the engines, a noise-suppression system (e.g., a muffler) may be incorporated into or coupled to the hybrid turbine engine. For example, the hybrid turbofan gas turbine engine shown in FIG. 13 may include a muffler or other noise-suppression system.

Figure 14:
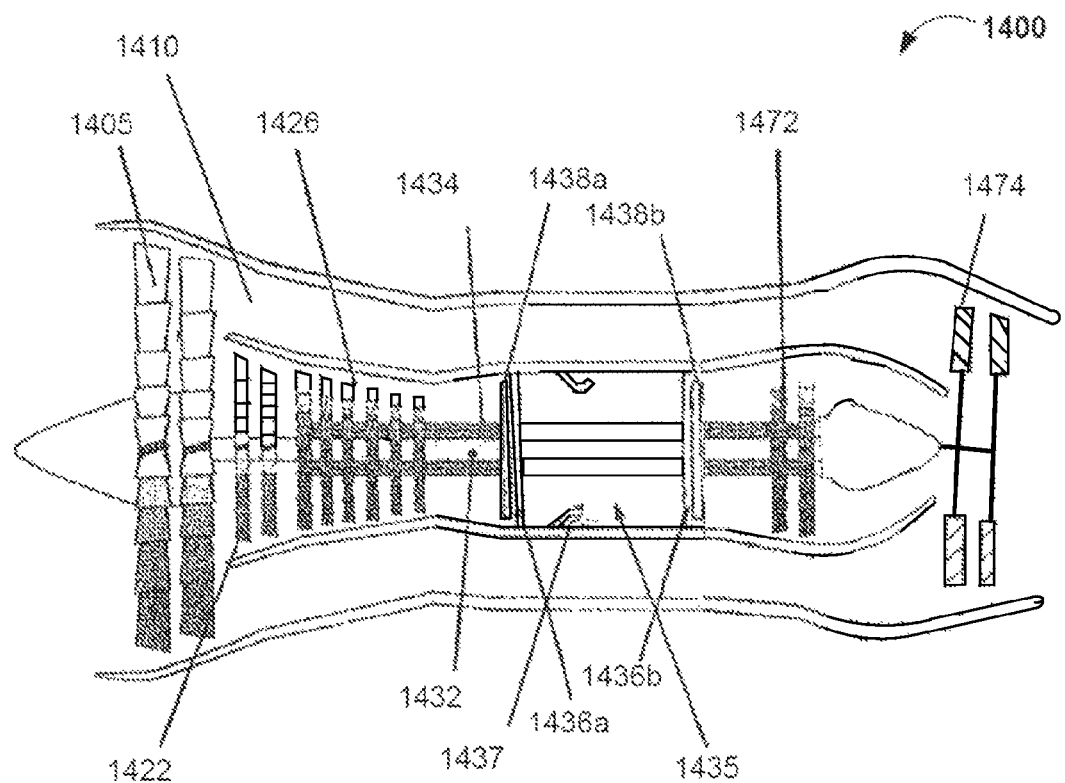
FIG. 14 is a cross-sectional view of a hybrid turbofan gas turbine engine according to another embodiment of the present invention.

FIG. 14 shows a further embodiment of a novel hybrid turbofan gas turbine engine 1400. The hybrid turbofan gas turbine has a similar design to the hybrid internal detonation-gas turbine engine shown in FIG. 3, including a fan 1405, a fan duct 1410, low and high-pressure compressors 1422 and 1426, low and high-pressure shafts 1432 and 1434, a fuel source/igniter 1437, rotors 1438a and 1438b, stators 1436a and 1436b, a detonation chamber 1435, a high-pressure turbine 1472, and an additional low-pressure turbine section 1474 that is located posteriorly to the fan ducts 1410. The low-pressure turbine section 1474 may be driven by the high-pressure air passing from the fan ducts 1410 and/or the hot, pressurized exhaust from the detonation chamber 1435. The hybrid gas turbine design may have a number of applications, including air, water, and land vehicles, as well as power generation.

As mentioned above, the presently described novel hybrid internal detonation-gas turbine engines may be used in power generation applications. In such applications, the hybrid internal detonation-gas turbine engine may or may not include a fan structure. For example, in some power generation embodiments, the novel hybrid internal detonation-gas turbine engine may be stationary, where the axle is coupled to and drives an electric generator. In such embodiments, the diameter of the hybrid internal detonation-gas turbine engine in the detonation section may be occupied with one or more detonation chambers, and optionally one or more conventional combustion chambers, (without fan ducts) in order to maximize the force and impulse that can be generated by the detonation section of the hybrid internal detonation-gas turbine engine. Additionally, the heat generated by the hybrid internal detonation-gas turbine engine may be used to heat water and produce steam to run a separate or integrated steam generator.

Figure 15:
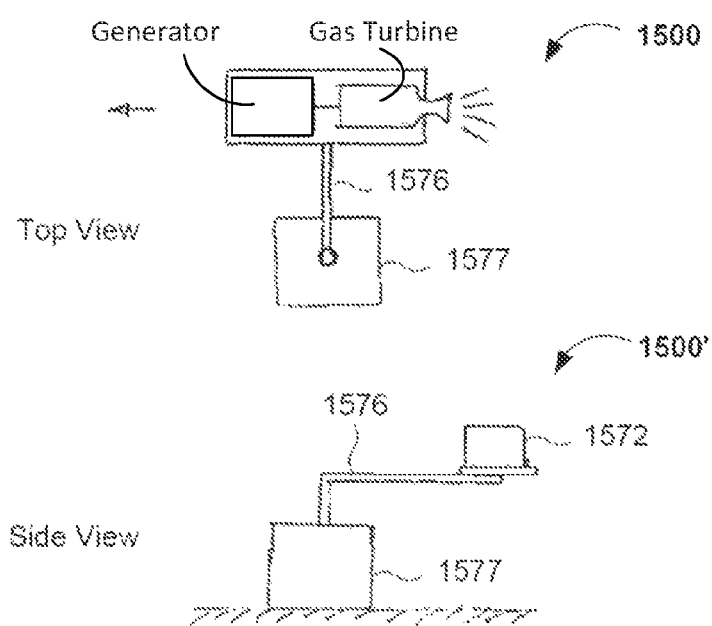
FIG. 15 is a diagram of a dual generator power plant according to one embodiment of the present invention.

In other power generation embodiments, a hybrid gas turbine engine (with or without a fan) can be used to drive the rotation of a shaft to mechanically drive a generator. As shown in the top and side views of FIG. 15, a hybrid gas turbine engine 1500 may be attached to a drive arm 1576, which is attached at its other end to a central generator 1577. As the hybrid gas turbine 1572 creates thrust, it moves forward and drives the rotation of the drive arm 1576. The drive arm 1576 in turn drives the rotation of an electric generator motor in the central generator 1577. Additionally, the axial shaft of the hybrid gas turbine engine may be coupled to an additional generator adjacent to the hybrid gas turbine engine, and may drive the rotation of an electric generator motor in the adjacent generator. The embodiment of FIG. 15 provides a dual electric power generation system.

Working Example

Figure 16:
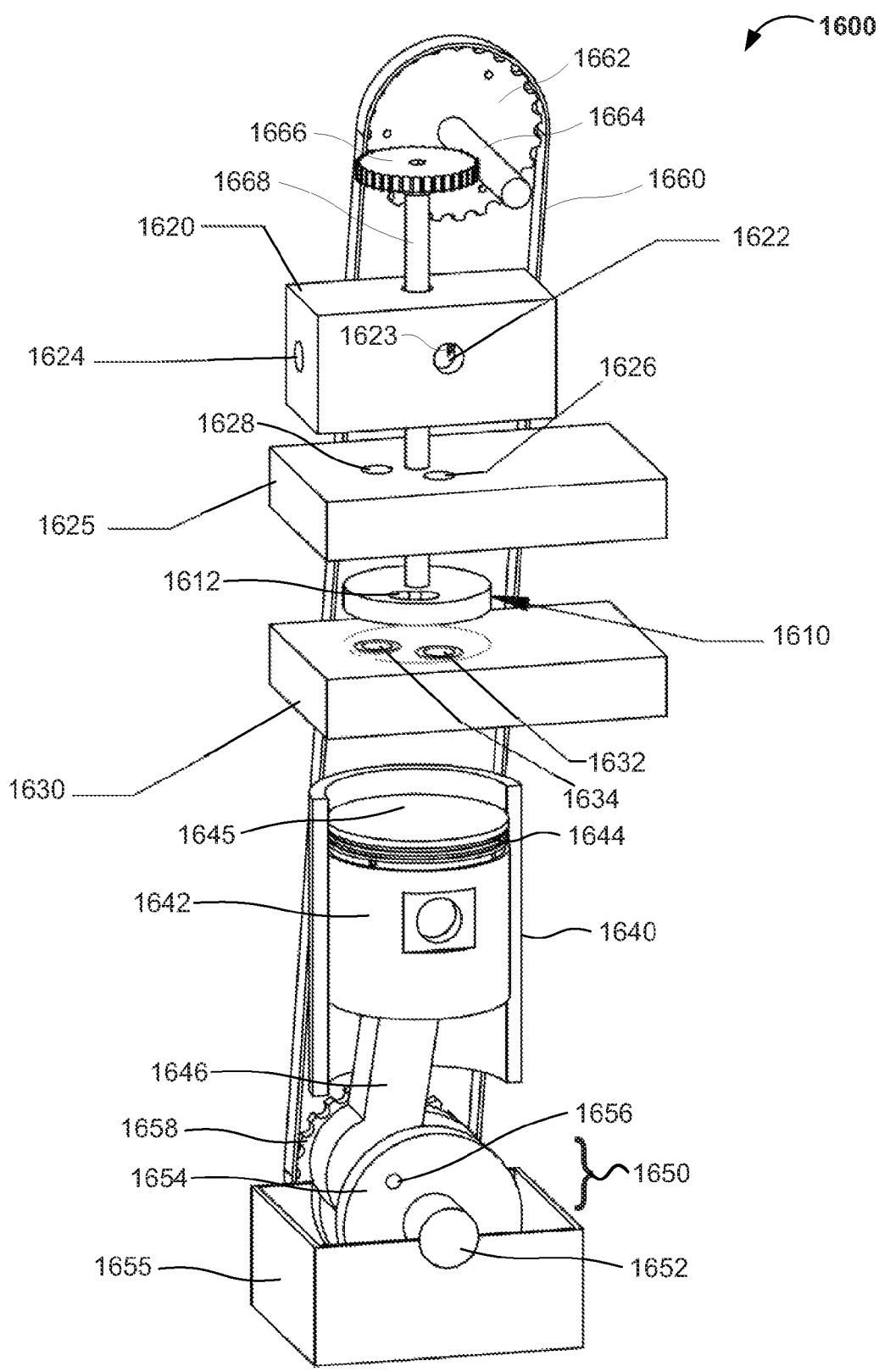
FIG. 16 is a diagram of an exemplary internal detonation engine according to one embodiment of the present invention, having a rotating valve therein.

FIG. 16 is a diagram of an exemplary internal detonation engine 1600 having a rotating (or rotary) valve 1610 in accordance with one aspect of the present invention. The internal detonation engine 1600 (which has been constructed and successfully operated using gasoline as a fuel) demonstrates that the present internal detonation engine and the present hybrid internal detonation-turbine engine can be successfully constructed and operated. The exemplary internal detonation engine 1600 is a four-stroke engine, as will be explained in greater detail with regard to FIGS. 19A-F.

Generally, the rotating valve engine 1600 includes an intake chamber (e.g., an upper intake chamber 1620 and a lower intake chamber 1625 below and/or adjacent to the upper intake chamber 1620). The upper intake chamber 1620 has an intake port 1622 and an exhaust port 1624 in gaseous or fluid communication with openings 1626 and 1628, respectively, in the lower intake chamber 1625. The upper intake chamber 1620 also includes a fuel injector outlet 1623 configured to inject fuel into the intake port 1622. Thus, the upper intake chamber 1620 may further include a tank, container or vessel for storing the fuel, and a pump and/or injector for injecting the fuel into the intake port 1622. The natural flow of air into the intake port 1622, through opening 1626, and into the combustion chamber carries the fuel into the combustion chamber. In one example (e.g., where the fuel comprises ammonium nitrate or sawdust), the injector comprises a powder injection gun. In another example, the fuel may comprise a solution of ammonium nitrate (e.g., in water), and the injector comprises an atomizer, vaporizer or other spray device that sprays the solution into a fine mist, enabling rapid vaporization of the solvent (e.g., water) and transportation of the suspension of fine ammonium nitrate powder into the combustion chamber. However, the engine 1600 may further comprise an air compressor (not shown) that injects compressed air into the intake port 1622.

The exemplary internal detonation engine 1600 further includes a cylinder head 1630 and a cylinder 1640, which together with a piston 1642, define the detonation chamber 1645. The cylinder head 1630 further includes a fuel/air inlet 1632 and an exhaust outlet 1634. The rotating valve 1610 is between the lower intake chamber 1625 and the cylinder head 1630. When the opening 1612 in the rotating valve 1610 is between the opening 1626 and the fuel/air inlet 1632, fuel and air are injected into the detonation chamber 1645, and when the opening 1612 in the rotating valve 1610 is between the opening 1628 and the exhaust outlet 1634, detonation gas(es) such as carbon monoxide, carbon dioxide, water vapor, and possibly gases such as nitrogen and/or nitrogen oxides, are ejected from the detonation chamber 1645.

Detonation of fuel in the detonation chamber 1645 drives the piston 1642 and connecting rod 1646 downward. The piston 1642 may further include one or more sealing rings 1644 to reduce or prevent loss of detonation energy through any gap between the piston 1642 and the cylinder 1640. The connecting rod 1646 thus has a first end rotatably attached to the piston 1642 and a second end rotatably attached to a crankshaft 1650. The second end of the connecting rod 1646, which is connected at a pin 1656 that is at a right angle through two parallel disks 1654 and offset from the center crankshaft axle 1652, drives rotations of the crankshaft 1650, which in turn rotates a gear 1658 that drives a belt or chain 1660. The crankshaft 1650 is in and/or on a crankcase 1655, which may be sealed or substantially joined to the cylinder 1640, in which case the crankcase 1655 may further contain a lubricant, such as motor oil.

The belt or chain 1660 drives an upper timing gear 1662, which in turn drives a right angle gear assembly (e.g., a threaded axle or shaft 1664 [threads not shown] and a perpendicular gear 1666). The drive system including gears 1658 and 1662 and belt or chain 1660 can be replaced with wheels and a belt or pulley. The perpendicular gear 1666 is centrally connected to a shaft or axle 1668, which rotates the rotor 1610.

In the exemplary engine 1600, the crankshaft 1650 and rotor 1610 have a ratio of rotation of 2:1 (i.e., the crankshaft 1650 rotates by 2° for every 1° that the rotor 1610 rotates). However, this ratio can be varied, depending on the relative sizes of gears 1658, 1662 and 1666, which can result in a different ratio of rotation. The desired ratio of rotation between the crankshaft 1650 and rotor 1610 may further depend on the size and angular spacing of the fuel/air inlet 1632 and the exhaust outlet 1634 in the cylinder head 1630, and the size and number of openings 1612 in the rotor 1610.

Typically, the rotor 1610, the rotor axle or shaft 1668, the intake chamber 1620/1625, the cylinder head 1630, the cylinder 1640, the piston 1642, the connecting rod 1646, the crankshaft 1650, the crankcase 1655, the timing gear 1662 and the right angle gear assembly 1664/1666 are made of a metal or metal alloy (e.g., aluminum), although some components may be made of or include different or additional materials. For example, the rotor 1610 and rotor axle or shaft 1668 may be coated with a low-friction material or coating, and/or may comprise or be made of a highly stress-resistant, heat-tolerant ceramic material. The crankshaft 1650 may comprise or be made of a metal or alloy that is harder and/or more thermally conductive than aluminum (e.g., a titanium alloy or steel), and the crankcase 1655 may comprise or be made of a metal or alloy that is harder and/or more impact-resistant than aluminum (e.g., steel).

Generally, the exhaust port is on the same side of the detonation chamber 1645 as the intake port because placing the exhaust port on the same side of the detonation chamber 1645 as the crankshaft 1650 may result in too much contamination in/on the crankshaft 1650 for the desired levels of efficiency and low maintenance. However, where engine maintenance and/or efficiency is not such a significant issue, or where the additional thrust provided by the release of exhaust gas(es) on the downstream side of the detonation chamber 1645 is useful, a two-stroke version of the exemplary engine 1600 can be made in which a semi-toroidal (e.g., "donut shaped") ring on the cylinder 1640 can collect the detonation gas(es) and provide additional thrust through one or more outlet tubes or pipes going in the direction of the crankcase. The bottom of the semi-toroidal ring is advantageously positioned just above the lowest point of the uppermost surface of the piston 1642 at the bottom of its stroke (i.e., when the second end of the connecting rod is at its lowest point in the cycle of the crankshaft 1650).

Figure 17:
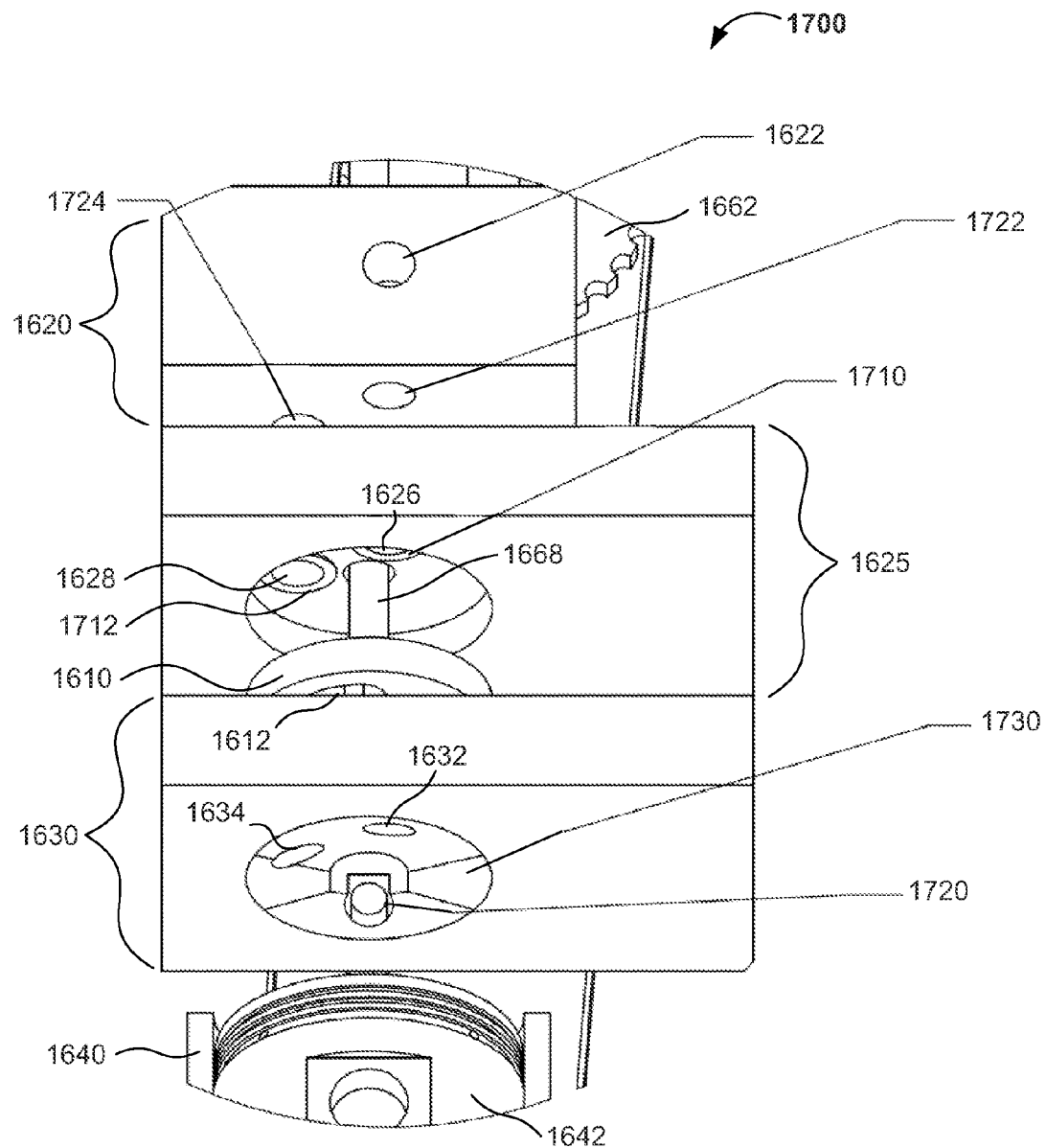
FIG. 17 is a cross-sectional view of the exemplary internal detonation engine of FIG. 16.

FIG. 17 is a perspective view 1700 of the intake chamber 1620/1625, the cylinder head 1630, and the rotor 1610 of the exemplary internal detonation engine 1600 of FIG. 16. The perspective view 1700 shows the intake inlet 1622 on a lateral portion of the upper intake chamber 1620, and an intake passage 1722 on a bottom surface of the upper intake chamber 1620. In addition, the perspective view 1700 shows two sealing rings 1710 and 1712 within the intake manifold (e.g., lower intake chamber 1625). Referring back to FIG. 16, similar sealing rings surround the uppermost surface of the fuel/air inlet 1632 and exhaust outlet 1634. The four sealing rings shown provide a substantially gas-tight seal around the rotor (or rotating valve) 1610. The sealing rings (e.g., rings 1710 and 1712 in FIG. 17) may comprise or be made of metal, ceramic, or other material that is wear-resistant, heat-resistant, and that has a relatively low coefficient of friction (e.g., brass bushing). Additionally or alternatively, the outer circumference of the rotor 1610 may include such a seal or sealing ring.

In addition, as shown in the perspective view 1700 the cylinder head 1630 has a concave indentation 1730 in a lower surface thereof (e.g., a surface in contact with the cylinder 1640). The concave indentation 1730 forms the uppermost portion of the combustion chamber (see combustion chamber 1645 in FIG. 16). Referring back to FIG. 17, positioned within the concave indentation 1730 of the cylinder head 1630 is a detonation or ignition device 1730 (e.g., a spark plug). The cylinder head 1630 may thus be further equipped with means for causing the detonation or ignition device 1730 to initiate the detonation or ignition of the fuel in the detonation chamber (e.g., a wire to the detonation or ignition device 1730 that carries an electronic pulse provided by a timing mechanism or, in the case of a multi-cylinder engine, further comprising a distributor). Also, either the intake chamber 1620/1625 or the cylinder head 1630 may be equipped with a fuel injection system (e.g., a conventional fuel injector in the case of liquid fuels such as fossil fuels or ethanol, or in the case of ammonium nitrate or sawdust as fuel, a powder injection gun).

FIGS. 18A-C are diagrams of the rotating valve (e.g., rotor 1610) and spring-loaded seal assembly in the exemplary internal detonation engine 1600 of FIG. 16. FIG. 18A shows a cross-sectional view of the rotor 1610 and seal assembly 1810-1812 for the intake chamber opening 1628 and the exhaust port 1634 along the C-C line across the lower intake chamber 1620 and cylinder head 1625. FIG. 18B shows a cross-sectional view of the rotor 1610 and seal assembly 1820-1822 for the intake chamber opening 1626 and the intake port 1632 along the D-D line across the lower intake chamber 1620 and cylinder head 1625. FIG. 18C is a close-up view of the rotor 1610 and sealing ring assembly 1810-1812 for the intake chamber opening 1626 and the intake port 1632 in the lower intake chamber 1620 and cylinder head 1625.

Referring to FIG. 18A, the rotor (e.g., rotating valve) 1610 is in a shallow cylindrical depression or cutout in the lower intake chamber 1625. The spark plug 1720 is seen at the top of the convex depression 1730 in the underside of the cylinder head 1630. Because the rotor 1610 must rotate in the depression or cutout in the lower intake chamber 1625, a very small gap may exist between the rotor 1610 and the lower intake chamber 1625 and/or the cylinder head 1630. To prevent undesired escape of exhaust detonation gases from this gap, a first sealing ring 1810 is placed in the opening 1628 of the lower intake chamber 1625 (which is connected to the exhaust port 1624 of the upper intake chamber 1620 [FIG. 16]) and a second sealing ring 1812 is placed in the exhaust port 1634 of the cylinder head. The opening 1628 and exhaust port 1634 may be machined with a slightly larger opening at the interface with the rotor 1610 to accommodate the sealing rings 1810 and 1812. Similar to the sealing rings 1710 and 1712 in FIG. 17, the sealing rings 1810 and 1812 may comprise or be made of metal, ceramic, or other material that is wear-resistant, heat-resistant, and that has a relatively low coefficient of friction (e.g., brass bushing).

In the views of FIGS. 18A-B, the opening 1612 is between the intake chamber openings 1626 and 1628. Thus, the rotor/valve opening 1612 is visible in FIG. 18B, but not in FIG. 18A. FIG. 18B shows the opening 1612 of the rotor 1610 beginning to overlap with the opening 1626 of the lower intake chamber 1625 and the intake port 1632 of the cylinder head 1630. Similar to the arrangement in FIG. 18A, to prevent undesired escape of fuel from any gap between the rotor 1610 and the lower intake chamber 1625 and/or the cylinder head 1630, a third sealing ring 1820 is positioned placed in the opening 1626 of the lower intake chamber 1625 (which is connected to the intake port 1622 of the upper intake chamber 1620 [FIG. 16]) and a fourth sealing ring 1822 is placed in the intake port 1634 of the cylinder head. Thus, the opening 1626 and intake port 1632 may also be machined with a slightly larger opening at the interface with the rotor 1610 to accommodate the sealing rings 1820 and 1822. The sealing rings 1820 and 1822 may comprise or be made of the same material(s) as the sealing rings 1810 and 1812.

FIG. 18C shows the rotor and sealing ring assembly of FIG. 18A in slightly greater detail. For example, the opening 1628 in the lower intake chamber 1625 and the exhaust port 1634 in the cylinder head 1630 may be manufactured (e.g., machined) to further accept washers 1834 and 1836 and springs 1830 and 1832 between the sealing rings 1810 and 1812 and the washers 1834 and 1836, respectively. The springs 1830 and 1832 apply a force and/or pressure to the sealing rings 1810 and 1812 as the sealing rings 1810 and 1812 wear down to keep them in continuous contact with the rotor 1610. Identical or similar springs and washers can also be placed behind the sealing rings 1820 and 1822 to apply a force and/or pressure to the sealing rings 1820 and 1822 as they wear down to also keep them in continuous contact with the rotor 1610. The rotor shaft/axle 1658 and/or lower intake chamber 1620 may be fitted with a sleeve 1840 configured to (i) reduce friction between the rotor shaft/axle 1658 and the lower intake chamber 1620 and/or (ii) reduce or minimize stress and/or strain on the rotor shaft/axle 1658.

FIGS. 19A-H are top-view diagrams of various positions of the rotating valve (e.g., rotor 1610) during certain operational stages of the exemplary internal detonation engine 1600 of FIG. 16. The rotor 1610 has an elongated opening 1612 to allow for complete opening of the intake and exhaust ports 1632 and 1634, for a duration of time based on the rotational speed of the rotor 1610. The intake and exhaust ports 1632 and 1634 (as well as openings 1626 and 1628 in the lower intake chamber or intake manifold 1625, FIG. 16) are circular, and have a diameter about the same as or slightly smaller than the width of the opening 1612 in the rotor. The intake and exhaust ports 1632 and 1634 are opened and closed by the rotation of the rotor 1610 to allow the air/fuel mixture into the combustion chamber and the exhaust gasses out. The ports are counterbored for and fitted with spring-loaded sealing rings 1812 and 1822 that contact and seal the rotor 1610. The port timing is similar to conventional engine's valve timing, and will be explained with regard to FIGS. 19A-H and the corresponding positions of the piston and crankshaft (not shown in FIGS. 19A-H; see piston 1642 and crankshaft 1650 in FIG. 16). In the center of the rotor 1610 is an axle 1668.

Figure 19A:
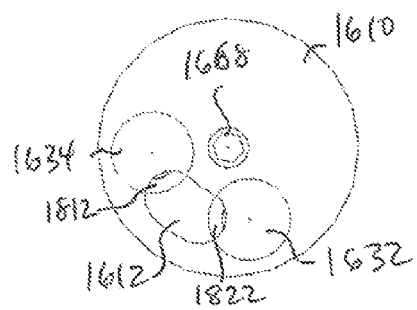
FIGS. 19A-H are diagrams of the rotating valve positions during various stages of operation of the exemplary internal detonation engine.

Referring to FIG. 19A, at the initial point (defined as 0° rotation of the crankshaft and the rotor 1610), the rotor/valve opening 1612 is positioned with a split overlap between the intake port 1632 and exhaust port 1634, in which both valves are slightly opened. At this position, the piston is positioned at the top dead center.

Figure 19B:
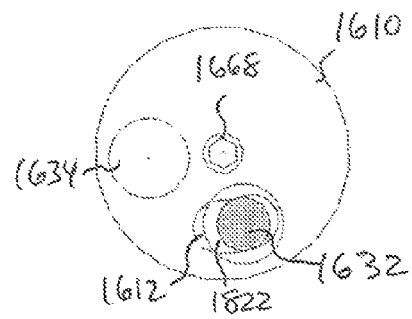

Referring now to FIG. 19B, a rotation of 90° in the crankshaft results in a 45° rotation in opening 1612 of the rotor 1610. The piston is traveling downward, and the rotating valve 1610/1612 fully closes off the exhaust port 1634 and fully exposes the intake port 1632. The air/fuel mixture is being drawn into the combustion chamber at this time, at least in part by the downward movement of the piston.

Figure 19C:
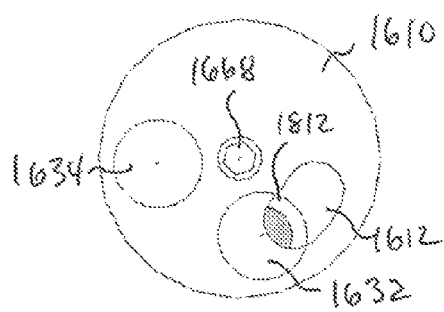

As shown in FIG. 19C, when the crankshaft is positioned at 180°, the rotor 1610 has rotated 90°, the piston is at the bottom dead center of the cylinder, and the rotating valve 1610/1612 has nearly closed off the intake port 1632. The complete closure of the overlap between opening 1612 of the rotor 1610 and the intake port 1632 (i.e., valve closure) is delayed to allow the inertia of the air/fuel mixture moving in the opening 1626 of the intake manifold 1625 to continue filling the combustion chamber.

Figure 19D:
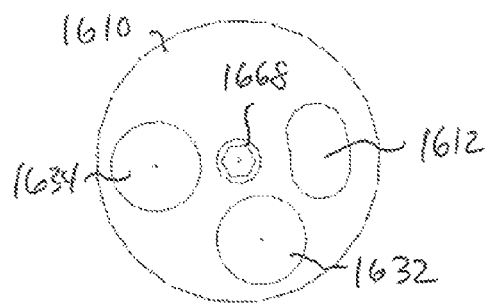

In FIG. 19D, the crankshaft position is at 270°, and the rotating valve 1610/1612 has closed the intake port 1632. The piston is traveling upward, compressing the air/fuel mixture. In certain embodiments (e.g., those using sawdust, ammonium nitrate or other solid-phase fuels), a high concentration of oxygen (such as is provided at several atmospheres to several tens or hundreds of atmospheres of air pressure) is important, and possibly necessary, for sufficiently complete detonation of the fuel. Thus, a compressor configured to compress the air in the intake inlet (or otherwise at the rotor) prior to injection into the combustion chamber may be advantageous.

Figure 19E:
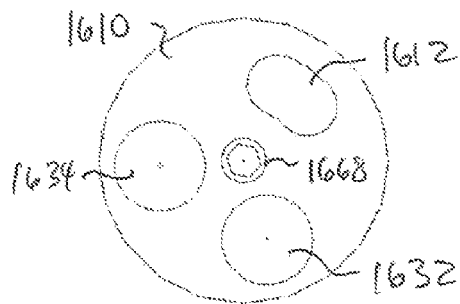

Referring now to FIG. 19E, the crankshaft position is at 360°, the rotor has rotated 180°, and the piston is back at the top dead center. The spark plug ignites the air/fuel mixture and the detonation (or combustion) process begins. In an alternative timing process, the spark plug ignites the air/fuel mixture shortly before the crankshaft position reaches 360° (e.g.,) 350°-359°, and the detonation process has started by the time the rotor reaches 180°. The intake and exhaust ports 1632 and 1634 are closed and sealed by sealing rings that contact the rotor 1610.

Figure 19F:
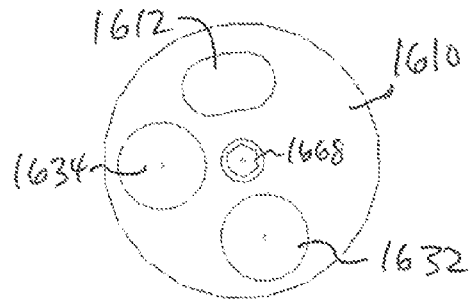
Figure 19G:
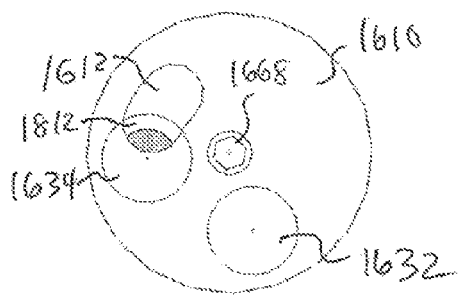

Referring to FIG. 19F, the crankshaft position is 450°, the rotor has rotated 225°, and the piston is traveling downward again under the force of the expanding gasses created during detonation. When the crankshaft is at 540° as shown if FIG. 19G, the rotor has rotated 270°, and the piston is now at the bottom dead center. The opening 1612 in rotor 1610 has begun exposing the exhaust port 1634, allowing exhaust detonation gas(es) to escape. The detonation gas(es) may be under pressure from additional gas molecules created during the detonation, the possible phase change of fuel molecules (e.g., from solid to gas phase), and/or from thermal expansion caused by an exothermic detonation reaction.

Figure 19H:
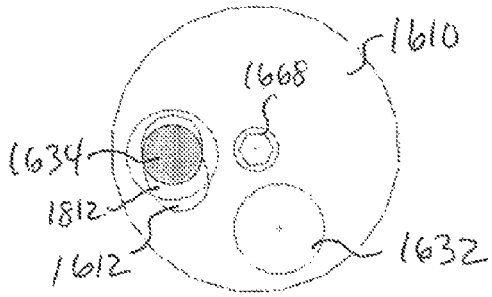

Referring now to FIG. 19H, the crankshaft position is at 630°, and the rotor 1610 has rotated 315°. The opening 1612 in the rotor 1610 has fully exposed the exhaust port 1634, and the piston is traveling upward forcing the exhaust detonation gas(es) out of the combustion chamber. When the rotor returns to 0° (FIG. 19A), the cycle is complete and ready to repeat.

Exemplary Methods of Converting Energy Using an Internal Detonation Engine

A further aspect of the present invention relates to a method of converting energy, comprising introducing a fuel into a detonation chamber through at least a first opening in a first stator at a first end of the detonation chamber; igniting or detonating a fuel in the detonation chamber; exhausting detonation gas(es) through a second opening in either the first stator or the detonation chamber; converting energy from igniting or detonating the fuel to mechanical energy at one or more shafts, wheels, or gears; and rotating a first rotor adjacent to the first stator, the first rotor having one or more third openings therein configured to (i) overlap with at least the first opening as the rotor rotates, and (ii) otherwise seal the first opening when the third opening(s) do not overlap with the first opening.

Converting energy from igniting or detonating the fuel to mechanical energy comprises driving one or more rods connected to a crankshaft that receives the mechanical energy from at least one of the one or more rods. The crankshaft drives a gear or wheel, and the gear or wheel in turn driving one or more shafts or belts.

Preferably, driving a timing gear receives the mechanical energy from at least one of the one or more shafts or belts, and directly or indirectly rotating the first rotor using the timing gear and an axle attached thereto. The detonation chamber comprises a cylinder and a cylinder head, the cylinder head having the first and second openings therein, and converting energy from igniting or detonating the fuel to mechanical energy comprises a slidably moving a piston within the cylinder, the piston being attached to the rod.

Preferably, the present invention provides the fuel through a fuel intake port in an intake chamber, the fuel intake port being in intermittent communication with the first opening, and exhausting the detonation gas(es) through an exhaust port in the intake chamber, the exhaust port being in intermittent communication with the second opening, wherein the intake chamber and the first stator sealingly house the first rotor and allow the first rotor to rotate between the intake chamber and the stator. Generally, a surface of the first rotor is lubricated to reduce friction between the first rotor and the first stator.

Alternatively, the detonation chamber includes a second stator, the second opening is in the second stator, and the method further comprises rotating a second rotor adjacent to the second stator, the second rotor having one or more fourth openings therein configured to overlap with the second opening as the second rotor rotates and otherwise seal the second opening when none of the one or more fourth openings overlap with the second opening. In various embodiments of the present invention, rotating one or more turbine fans rotatably fixed to a shaft using the mechanical energy.

Additionally or alternatively, the present method further includes rotating one or more rotary fans rotatably fixed to the shaft, at least one of the one or more rotary fans being on an opposite side of the detonation chamber from the one or more turbine fans. Generally, the rotary fan(s) are part of a compressor, and alone or together with one or more additional rotary fans, may define a compressor stage. The rotary fan(s) compress the air at the rotor (prior to being taken and/or injected into the combustion chamber) by several atmospheres to several tens or hundreds of atmospheres. Such high air pressures ensure a significantly greater likelihood of substantially complete detonation of liquid-phase and especially solid-phase fuels, such as sawdust, ground or shredded paper, ammonium nitrate, combinations thereof, etc.

It is anticipated that the novel hybrid internal detonation-gas turbine engines, including the internal detonation chamber design, will generate additional force and impulse, with increased specific impulse, to the turbine blades, and thus improves overall efficiency of the engine, and with little additional capital cost. The present hybrid internal detonation-gas turbine engines are generally capable of running on just about any fuel, including natural gas, petroleum fuels, ammonium nitrate, ethanol and bio-fuels. Other sources of fuel that can be used to generate power and/or mechanical energy using the present hybrid internal detonation-gas turbine include gunpowder, sawdust, straw, paper (e.g., ground, chopped, or shredded paper), and/or other inexpensive, renewable sources of energy. Thus, the presently described hybrid internal detonation-gas turbine engines are not dependent on dwindling oil reserves, and may be run on alternative fuels.

CONCLUSION/SUMMARY

The present invention provides novel hybrid internal detonation-gas turbine engines, which may be used to propel air, water, and ground vehicles, or for power generation. The present invention improves on the performance of existing turbofan and gas turbine engines by integrating the element of pulse detonation into a general turbine engine design. The novel hybrid internal detonation-gas turbine engine may have improved impulse, efficiency, and reduced fuel consumption in comparison to existing gas turbine and turbofan technologies.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application. It is intended that the scope of the invention be defined by the claims appended hereto and their equivalents.

What is claimed is:
1. An internal detonation engine, comprising:
a) a cylinder;
b) a cylinder head having a number of first openings therein configured to receive a fuel and a number of second openings therein configured to exhaust detonation gas(es);
c) a fuel igniter configured to ignite or detonate the fuel in the cylinder;
d) a stator at a first end of the cylinder having an upper intake chamber, a lower intake chamber, and a number of third openings therein equal to the number of first openings and a number of fourth openings therein equal to the number of second openings, the third openings overlapping with the first openings, and the fourth openings overlapping with the second openings;
e) a rotor in a depression or cutout at an interface between the stator and the cylinder head, the rotor having a smooth edge and one or more fifth openings therein configured to overlap with the first, second, third and fourth openings as the rotor rotates:
f) an axial shaft connected to and configured to drive the rotor, the axial shaft passing through the upper intake chamber and the lower intake chamber, and the fuel igniter being in a location other than that of the axial shaft;
g) an energy transfer mechanism configured to transfer energy from igniting or detonating the fuel to mechanical energy, the energy transfer mechanism comprising a piston configured to slidably fit within the cylinder, h) a drive mechanism comprising one or more rods attached to the piston and configured to receive the mechanical energy.

2. The engine of claim 1, wherein the upper intake chamber has (i) a fuel intake port in communication with at least one of the number of third openings and (ii) an exhaust port in communication with at least one of the number of fourth openings, wherein the cylinder head and the stator sealingly house the rotor and allow the rotor to rotate between the lower intake chamber and the cylinder head, the at least one of the number of third openings is in intermittent communication with at least one of the number of first openings, and the at least one of the number of fourth openings is in intermittent communication with at least one of the number of second openings.

3. The engine of claim 1, further comprising a timing gear configured to (i) receive the mechanical energy from the drive mechanism and (ii) drive the axial shaft.

4. The engine of claim 3, further comprising a crankshaft receiving the mechanical energy from at least one of the one or more rods.

5. The engine of claim 4, wherein the crankshaft drives a gear or wheel, the gear or wheel in turn driving one or more shafts or belts configured to drive the timing gear.

6. The engine of claim 1, wherein each of the number of the first openings, the number of the second openings, the number of the third openings, and the number of the fourth openings is two.

7. The engine of claim 6, wherein the number of the fifth openings is four.

8. The engine of claim 1, further comprising a lubricant and/or a surface coating on the rotor, the lubricant and the surface coating reducing friction between the rotor and the stator.

9. The engine of claim 1, wherein the energy transfer mechanism includes a mechanism configured to receive the mechanical energy from the drive mechanism that drives the axial shaft.

10. A hybrid internal detonation-turbine engine, comprising:
a) the internal detonation engine of claim 1;
b) a shaft; and
c) a compressor, upstream from the stator and rotor;
d) one or more turbines rotatably fixed to the shaft, downstream from the internal detonation engine.

11. A method of converting energy, comprising:
a) receiving a detonatable fuel in at least one first opening in a stator, wherein the stator comprises an upper intake chamber and a lower intake chamber;
b) introducing the fuel into a detonation cylinder through at least one second opening in a cylinder head at a first end of the cylinder, the second opening overlapping with the first opening;
c) igniting or detonating the fuel in the cylinder using a fuel igniter;
d) exhausting detonation gas(es) through a third opening in the stator and a fourth opening in the cylinder head, the third opening overlapping with the fourth opening;
e) converting energy from igniting or detonating the fuel to mechanical energy at one or more shafts, wheels, or gears; and
f) rotating an axial shaft passing through the upper intake chamber and the lower intake chamber, the axial shaft connected to and configured to drive a rotor in a depression or cutout at an interface between the cylinder head and the stator, the fuel igniter being in a location other than that of the rotor, the rotor having a smooth edge and one or more fifth openings therein configured to overlap with (i) one of the at least one first opening and the second opening and (ii) one of the at least one third opening and the fourth opening as the rotor rotates, and otherwise seal the second and fourth openings when none of the one or more fifth openings overlaps with the first or third opening.

12. The method of claim 11, wherein converting energy from igniting or detonating the fuel to mechanical energy comprises driving one or more rods connected to a crankshaft that receives the mechanical energy from at least one of the one or more rods.

13. The method of claim 12, wherein the crankshaft drives a gear or wheel, and the gear or wheel in turn driving one or more shafts or belts.

14. The method of claim 13, further comprising driving a timing gear that receives the mechanical energy from at least one of the one or more shafts or belts, and drives the axial shaft using the timing gear and an axle attached thereto.

15. The method of claim 12, wherein converting energy from igniting or detonating the fuel to mechanical energy comprises slidably moving a piston within the cylinder, the piston being attached to the at least one of the one or more rods.

16. The method of claim 11, further comprising:
a) providing the fuel through a fuel intake port in an intake chamber, the fuel intake port being in intermittent communication with the first opening, and
b) exhausting the detonation gas(es) through an exhaust port in the intake chamber, the exhaust port being in intermittent communication with the third opening,
wherein the stator and the cylinder head sealingly house the rotor and allow the rotor to rotate between the stator and the cylinder head.

17. The method of claim 11, further comprising lubricating a surface of the rotor to reduce friction between the rotor and the stator.

18. The method of claim 11, further comprising rotating one or more turbines rotatably fixed to a shaft using the mechanical energy.

19. The engine of claim 1, wherein the rotor also has smooth upper and lower surfaces configured to interface with the stator and the cylinder head, respectively.

20. The engine of Claim 1, wherein the cylinder head and the stator sealingly house the rotor.

21. The method of claim 11, wherein the cylinder head and the stator sealingly house the rotor.

* * * * *